(12) United States Patent
Heringlehner et al.

(10) Patent No.: US 11,229,225 B2
(45) Date of Patent: Jan. 25, 2022

(54) METERING CONTAINER AND METERING DEVICE

(71) Applicant: PRINT2TASTE GMBH, Freising (DE)

(72) Inventors: Johannes Heringlehner, Freising (DE); Sebastian Janik, Freising (DE); Thomas Lötzbeyer, Kranzberg (DE)

(73) Assignee: Print2Taste GmbH, Freising (DE)

( * ) Notice: Subject to any disclaimer, the term of this patent is extended or adjusted under 35 U.S.C. 154(b) by 0 days.

(21) Appl. No.: 16/985,453

(22) Filed: Aug. 5, 2020

(65) Prior Publication Data

US 2021/0051985 A1  Feb. 25, 2021

Related U.S. Application Data

(63) Continuation of application No. 15/566,070, filed as application No. PCT/EP2016/058011 on Apr. 12, 2016, now abandoned.

(30) Foreign Application Priority Data

Apr. 14, 2015 (DE) ...................... 10 2015 004 826.0
Aug. 21, 2015 (DE) ...................... 10 2015 011 012.8

(51) Int. Cl.
*A23L 5/00* (2016.01)
*A23G 3/28* (2006.01)
*A23P 20/15* (2016.01)
*A23L 2/395* (2006.01)
*B01F 1/00* (2006.01)
(Continued)

(52) U.S. Cl.
CPC ............... *A23L 5/55* (2016.08); *A23G 3/28* (2013.01); *A23L 2/395* (2013.01); *A23P 20/15* (2016.08); *B01F 1/0027* (2013.01); *B01F 15/026* (2013.01); *B01F 15/0212* (2013.01); *B01F 15/0278* (2013.01); *B65D 83/0072* (2013.01);
(Continued)

(58) Field of Classification Search
CPC ........ A23L 5/55; A23L 2/395; B01F 15/0212; B01F 15/0278; B01F 2215/0014; B65D 83/0072; A23P 20/15; A23G 3/28; A23V 2002/00
USPC ........................................................ 222/333
See application file for complete search history.

(56) References Cited

U.S. PATENT DOCUMENTS 5,114,240 A  5/1992  Kindt-Larsen et al.
5,795,330 A  8/1998  Tofighi et al.
(Continued)

FOREIGN PATENT DOCUMENTS

DE  10007580 A1  8/2001
DE  10127625 A1  1/2003
(Continued)

OTHER PUBLICATIONS

English Translation of the Written Opinion of the International Search Authority directed to related International Application No. PCT/EP2016/058011, dated Sep. 22, 2016; 9 pages.
(Continued)

*Primary Examiner* — Jeremy Carroll
(74) *Attorney, Agent, or Firm* — Sterne, Kessler, Goldstein & Fox P.L.L.C.

(57) ABSTRACT

The invention relates to a metering container for mixtures of food products and liquids, a metering device for mixtures of food products and liquids and a method for metering mixtures of food products and liquids.

20 Claims, 8 Drawing Sheets

Figure 1:
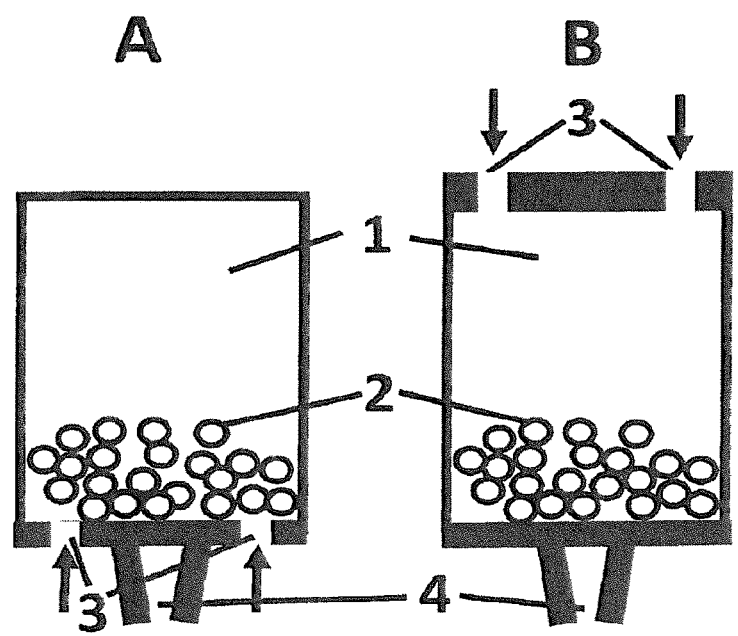

(51) Int. Cl.
   *B01F 15/02* (2006.01)
   *B65D 83/00* (2006.01)
(52) U.S. Cl.
   CPC ... *A23V 2002/00* (2013.01); *B01F 2215/0014* (2013.01)

(56) References Cited

U.S. PATENT DOCUMENTS

| | | | |
|---|---|---|---|
| 5,826,751 | A | 10/1998 | Stanley et al. |
| 6,089,774 | A | 7/2000 | Franken et al. |
| 2004/0011815 | A1 | 1/2004 | Martin |
| 2005/0128868 | A1 | 6/2005 | Vries |
| 2005/0184101 | A1 | 8/2005 | Masuda |
| 2006/0227653 | A1 | 10/2006 | Keller |
| 2008/0260918 | A1* | 10/2008 | Lai .................. B29C 64/165 426/231 |
| 2010/0276458 | A1 | 11/2010 | Buck |
| 2015/0296856 | A1 | 10/2015 | Chandra et al. |
| 2015/0310695 | A1* | 10/2015 | Holman ................. G07F 9/002 700/236 |
| 2018/0140000 | A1* | 5/2018 | Bouziad ................. B33Y 30/00 |

FOREIGN PATENT DOCUMENTS

| | | | |
|---|---|---|---|
| DE | 10310162 | A1 | 9/2004 |
| DE | 602004006442 | T2 | 1/2008 |
| DE | 202010012093 | U1 | 11/2010 |
| DE | 102011013675 | A1 | 4/2013 |
| DE | 102013002604 | A1 | 8/2014 |
| DE | 102015004826 | A | 10/2016 |
| DE | 102015011012 | A | 2/2017 |
| EP | 1657183 | A2 | 5/2006 |
| EP | 3282860 | A1 | 2/2018 |
| GB | 2506940 | A | 4/2014 |
| WO | WO 94/13154 | A2 | 6/1994 |
| WO | WO 95/28857 | A1 | 11/1995 |
| WO | WO 02/087400 | A1 | 11/2002 |
| WO | WO 2005/018830 | A2 | 3/2005 |
| WO | WO 2009/064762 | A2 | 5/2009 |
| WO | WO 2011/054402 | A1 | 5/2011 |
| WO | WO 2012/007772 | A2 | 1/2012 |
| WO | WO 2013/012660 | A1 | 1/2013 |
| WO | WO 2016/166099 | A1 | 10/2016 |

OTHER PUBLICATIONS

English Translation of International Preliminary Report on Patentability directed to related International Application No. PCT/EP2016/058011, dated Dec. 12, 2017; 10 pages.

English-language abstract of German patent publication 10127625 A1, published Jan. 9, 2003; 1 page.

English-language abstract of German patent publication 10310162 A1, published Sep. 14, 2009; 1 page.

English-language abstract of German patent publication 102011013675 A1, published Apr. 4, 2013; 1 page.

English-language abstract of German patent publication 102013002604 A1, published Aug. 21, 2014; 1 page.

International Search Report dated Sep. 22, 2016 in International Application No. PCT/EP2016/058011.

* cited by examiner

METERING CONTAINER AND METERING DEVICE

The invention relates to a metering container for food products, a metering device for food products and a method for metering food products. In particular, the invention relates to a metering container containing a food product, preferably a food product in powder form, and being so adapted that the food product is converted into a flowable formulation by the introduction of a liquid into the metering container. The invention further relates to a metering device into which the metering container can be mounted and by means of which, on the one hand, precisely defined amounts of a liquid can be introduced into the metering container and, on the other hand, precisely defined amounts of a mixture of a food product and a liquid can be metered.

The application of viscous products, such as fruit or chocolate sauces for decorating plates, desserts, pastries or sweets is known from the prior art. So far, however, this decorating operation was very time-consuming due to the manual preparation and application of the products for the decoration, and the accuracy and precision of the products made was directly dependent on the skills of the person making them. Additionally, no high resolution could be achieved in the objects made.

Within the last few years, first technical solutions have become known for replacing the manual process with an automated process. However, the devices used are still very complex and expensive due to the plurality of components required.

Recently, various less expensive systems for an automated process of metering various food product components, such as fruit or chocolate sauces, for producing three-dimensional structures by means of 3D printing have become known. They are based on medical syringes with different metering tips in the shape of a needle. The plunger of the syringe is fixed in a retainer and said retainer is reciprocated by means of a motor in combination with a complex driving mechanism on the basis of gear wheel combinations and a threaded rod.

Apart from the complex structure of the driving system, the use of medical syringes into which different food product components are filled represents a potential source of microbial risks. The food product is not completely enclosed by a surrounding casing. Since the space between the syringe cylinder and the syringe plunger is not microbiologically tightly sealed, microorganisms can get into the food product component by the movement of the plunger and thus may entail that the food product microbially spoils. Furthermore, this system only provides an automated metering process for food products having an appropriate viscosity or flowability. The introduction of water or other liquids into the syringe cylinder to modify the viscosity or flowability of food products is not possible in an automated way.

Containers are known in the prior art which contain a powder and are mounted into a device by means of which water can be introduced into the container. So far, however, the water is used in these containers solely in a flow-through process either for the purpose of extracting specific ingredients from the powder (reference is exemplarily made in this connection to a container which contains coffee powder and in the case of which a coffee drink is prepared by hot water, using a coffee machine) or for the purpose of flushing a powder in the container completely out of the device by hot water (reference is exemplarily made in this connection to a container which comprises a powder formulation for preparing an infant formula and in the case of which hot water flowing through the capsule completely dissolves this powder formulation and flushes it into a baby milk bottle by means of a device; cf. EP 2 236 437). In each of these cases, the addition of the water takes place without an increase in volume of the capsule and it is a basic requirement of this process that from the very beginning there is both an opening for the addition of the water in the container and an opening for the passive discharge of the aqueous solution. Furthermore, the capsules comprise a wall having low flexibility.

With the described containers and the respective devices and methods, it is up to now, according to the current state of the art, therefore only possible to transport completely dissolved powder components out of a container (e.g., infant formula) or to extract soluble components from a powder mixture of insoluble and soluble components and to transport them thus out of the container with the liquid. In the case of coffee powder, for example, soluble components are flushed out with the water, insoluble components remain in the container. The conversion of a powder by means of a liquid into a flowable, viscous component which subsequently can be metered out of the container as completely as possible and in exactly defined amounts has not been described so far. Therefore, the invention is based on the object of providing a metering container, a metering device and a metering method addressing the aforementioned drawbacks of the prior art. This object is achieved with the subject-matter of the independent claims. Preferred embodiments are described in more detail in the dependent claims and the following description.

The present invention deals, i.a., with the provision of a metering container, a metering device and/or a method for food products which permits to introduce a liquid into the metering container and to meter a mixture of the food product and the liquid contained in the metering container.

In particular, the invention also deals with a metering container, a metering device and/or a method according to the present invention which can be employed in 3D printing of food products.

Accordingly, the present invention is directed to, i.a., metering containers for food products, wherein the metering container comprises a flexible wall having a wall thickness of 0.5 mm or less and a first end comprising a metering outlet, wherein the metering container contains a food product, and wherein, in addition to the metering outlet, at least one portion is provided that is adapted for the introduction of a liquid into the metering container.

What is meant by a metering container in the context of the present invention is preferably a container in which one or more food products to be metered are contained. Preferably, the metering container can be stored in a closed state for any length of time.

The metering container is characterized in that it comprises a flexible wall having a wall thickness of 0.5 mm or less, preferably 0.2 mm or less and most preferably 0.1 mm or less. The flexible wall preferably has the shape of a lube or cylinder. The flexible wall permits the metering container containing the food product to be compressed without great additional effort. Moreover, it permits that the flexible wall and thus also the food product contained in the metering container have a contact over as large an area as possible with the inner surface of the cylinder of a metering device for accommodating the metering container also during or after compression by the plunger. In particular, the flexible wall also minimizes residues in the metering container after the metering operation.

What is meant by a metering outlet in the context of the present invention is preferably an opening in the metering container through which upon the introduction of a liquid the mixture of the food product and the liquid contained in the metering container can be metered onto a metering substrate. Preferably, a metering outlet is configured such that it permits a metering operation as precise as possible. Moreover, a metering outlet is preferred which can be lightly sealed, e.g., by means of a closure, such that the food product is isolated from the environment and thus protected in particular against contamination with microorganisms. Tightly sealed further means that the food product, the introduced liquid and/or the mixture of the food product and the liquid cannot inadvertently escape from the metering container. Furthermore, the closure of the metering outlet enables that a mixture of the food product and the liquid can be formed prior to the metering operation. Known metering containers, by contrast, are only adapted for flow-through metering processes. This impedes, for example, a virtually complete metering operation as well as the production of a homogenous and/or flowable mixture in the case of some food products.

In the context of the present invention, a homogeneous mixture is a mixture of different substances (in particular a food product or food products and a liquid) whose mass ratio differs at any place of the mixture per $0.5$ cm$^3$ by less than 50%, preferably 30%, most preferably by less than 20%.

In the context of the present invention, a flowable mixture (in particular of a food product and a liquid) is a mixture of different substances (in particular of a food product or food products and a liquid) having a viscosity of $10^7$ mPas or less, preferably $5 \times 10^6$ mPas or less and most preferably $10^6$ mPas or less. Preferably, the dynamic viscosity is determined via the process of the rotational viscometry: The determination is performed according to DIN 53019-1:2008-09 (Viscometry—Measurement of viscosities and flow curves by means of rotational viscometers) at a temperature of 20° C. and a speed of 10 rpm.

What is meant by a metering substrate in the context of the present invention is preferably an area onto which the food product to be metered can be applied. Preferably, the substrate may be a board, a plate, a plastic surface or a metal surface.

What is meant by a portion of the metering container in the context of the present invention is a region of the metering container (in particular on the surface of the metering container) which has an area of $0.05$ cm$^2$ to $2$ cm$^2$, at least $1.5$ cm$^2$, at least $1$ cm$^2$, at least $0.5$ cm$^2$, at least $0.3$ cm$^2$, preferably at least $0.1$ cm$^2$, at most $1.5$ cm$^2$, at most $1$ cm$^2$, at most $0.5$ cm$^2$, at most $0.3$ cm$^2$ and/or preferably at most $0.1$ cm$^2$ and which permits a liquid to be introduced into the metering container. A portion of the metering container is preferably provided at the first end comprising the metering outlet and/or at a second end opposite the first end. According to the present invention, a portion is adapted for the introduction of a liquid into the metering container via said portion. Preferably, the portion enables that a liquid can be introduced into the metering container but is otherwise tightly sealed. Preferably, the portion is tightly sealed again after the introduction of a liquid. In particular, the portion is to be sealed tightly enough that the liquid, the food product and/or the mixture thereof cannot escape through the portion. Preferably, it is envisaged that, after introduction of the liquid, the portion is sealed tightly enough that the liquid, the food product and/or the mixture thereof is prevented from escaping even at a pressure on the container (in particular internal pressure) of up to $1 \times 10^8$ Pa, preferably $5 \times 10^7$ Pa or most preferably $1 \times 10^7$ Pa. A portion can comprise, for example, an opening, preferably a tightly sealable opening (tightly sealable, e.g., by means of a closure). Alternatively, the portion may comprise a check valve. Such a check valve is to permit the introduction of a liquid and to prevent the escape of the liquid as described above. Likewise, the portion may comprise an elastic membrane. The membrane is preferably configured such that it can be punctured by an appropriate hollow needle which permits the introduction of a liquid into the metering container via the hollow needle. Most preferably, the membrane seals the metering container tightly again after the removal of the hollow needle.

What is meant by a portion in the context of the present invention is preferably a region of the metering container in which a liquid can be added in a metered manner into the metering container by the formation of a resealable opening. This may be preferably either a resealable membrane in the wall of the metering container or a valve which seals itself again once the liquid has been added in a metered manner into the metering container.

What is meant by a food product in the context of the invention is a product which is suitable for consumption and may be available in the form of a solid, a powder, a porous material, a paste or mixtures of these forms. Proteins, carbohydrates, fats, water, coloring and flavoring agents, ingredients beneficial on health grounds, such as dietary fibers, vitamins or mineral nutrients, as well as ingredients necessary for shelf life, such as antioxidants or preservatives, may preferably be ingredients of the food product.

In particular, the food product is preferably a flowable (i.e., liquid, viscous and/or pasty), solid and/or powdery food product. A solid and/or powdery food product is most preferred. In particular, a powdery food product is preferred. A solid food product preferably comprises a low water content. A water content of 20% or less is preferred, a water content of 15% or less is more preferred and a water content of 10% or less is most preferred.

What is meant by powdery is a disperse system comprising at least one solid component and at least one gaseous component, wherein the solid phase is present in loose cohesion. Preferably, these products may occur in a crystalline or an amorphous form.

Powdery and/or solid food products involve the advantage that they exhibit a lower weight than dissolved food products. Moreover, powdery and/or solid food products are characterized by a longer shelf life due to their low water content. In the present invention, in particular a food product is contemplated which is available in a form that requires the addition of a liquid prior to its metering and/or consumption. The food product may be, for example, a powdery or solid food product to which a liquid is added in order to obtain a flowable (i.e., liquid, viscous and/or pasty) mixture. In the case of a liquid, it may be, for example, a concentrate that is diluted by the addition of a liquid in order to obtain and meter, for example, a mixture appropriate for consumption.

The food product in the metering container of the present invention is further preferably adapted to be absorbed by a liquid, which means that a solution, suspension, foam, emulsion, dispersion and/or combination of the food product and the solution is formed. Preferably, the food product can be fully absorbed by the liquid, i.e., without any residues. Additionally, food products, in particular in powdery or solid form, are conceivable, wherein said food products can be converted into a flowable form by a change in temperature and/or the addition of a liquid. Furthermore, food products which form a solution, suspension, foam, emulsion, dispersion and/or combination of the food product and the solution only upon a change in temperature and the addition of a liquid are conceivable. A change in temperature may be either an increase in temperature or a decrease in temperature that leads to the aforementioned effect(s).

What is meant by flowable food products in the context of the present invention are preferably food products having a viscosity of less than $10^7$ mPas, preferably less than $5\times10^6$ mPas, most preferably less than $10^6$ mPas. The determination is performed according to DIN 53019-1:2008-09 (Viscometry—Measurement of viscosities and flow curves by means of rotational viscometers) at a temperature of 20° C. and a speed of 10 rpm. In particular crushed fruit, vegetable, meal or fish products, solutions of gelling agents, of thickening agents, egg, milk or flour products with water, cacao or coffee products, oils, doughs, pastes or combinations of these food products form part of the group of flowable (liquid and/or pasty) food products.

In particular chocolate, cacao, gelled products such as fruit, vegetable or other food product jellies as well as mixtures of these products form part of the group of the solid food products. These products are preferably available as a powder.

In particular powdery dried potato products, powdery cereal and/or other seed products, dried proteins, carbohydrates such as, for example, maltodextrin and/or starch comprising flavoring and/or taste-producing substances and/or gelling and thickening agents as well as mixtures of these products form part of the group of powdery food products.

In the context of the invention, a liquid is a flowable product. Preferably, a liquid is flowable to such an extent that it can be introduced into the metering container via the portion upon the installation of the metering container in the metering device. Preferably, the liquid is water, alcohol, oil as well as mixtures of these components. These liquids may in particular additionally comprise dissolved substances such as, for example, proteins, carbohydrates, coloring agents, antioxidants, salts, sweetening ingredients such as sugar, artificial sweeteners or other sweetening compounds, acids, dietary fibers or ingredients beneficial on health grounds, such as vitamins or mineral nutrients. Basically, one or at least one of the aforementioned liquids can be introduced into the metering container.

What is meant by flowable in connection with the liquid to be introduced into the metering container is preferably a liquid/product/mixture having a viscosity of 1000 mPas or less, preferably 100 mPas or less and most preferably 10 mPas or less at a temperature of 20° C. The determination is performed according to DIN 53019-1:2008-09 (Viscometry—Measurement of viscosities and flow curves by means of rotational viscometers) at a temperature of 20° C. and a speed of 10 rpm.

The metering container according to the present invention comprises one or at least one portion that is adapted for the introduction of a liquid into the metering container, wherein this portion or at least one of these portions is preferably provided at the first end of the metering container. A metering container can likewise comprise one or at least one such portion at the second end, which is opposite the first end. A metering container according to the present invention can also comprise one such portion or at least one such portion at the first end and one such portion or at least one such portion at the second end. It is also possible that the portion or at least one of the portions is provided at the metering outlet. Thus, a metering container according to the present invention can also comprise one or at least one portion at the first end, one or at least one portion at the second end and one or at least one portion at the metering outlet. A metering container whose flexible wall does not comprise such a portion is preferred.

The portion or at least one of the portions of the metering container preferably comprises an opening. The opening permits the introduction of liquids into the metering container. Preferably, it can be tightly sealed by means of a closure. The opening of the metering container preferably should be sealable by means of the closure in such a way that in particular the undesired entry of, for example, microorganisms is prevented. This is advantageous in that the shelf life of the food product contained in the container is increased. On the other hand, the tight sealing is also intended to prevent food product leakage. The closure should preferably be configured such that it can be removed and/or opened prior to/for the introduction of the liquid. A closure which is adapted to tightly reseal the opening after the removal of the closure is particularly preferred. In particular, the closure is to tightly reseal the opening after the introduction of the liquid. In this context, tightly sealing preferably means that the liquid and/or food product and/or mixture of the liquid and the food product is prevented from escaping or leaking and/or that the contained food product and/or liquid and/or mixture of the liquid and the food product is isolated from the environment so that during the metering process no food product and/or no liquid and/or no mixture of the food product and the liquid can escape or leak from this portion of the metering container. Preferably, the closure is configured such that it tightly seals the opening up to an internal pressure of the metering container of up to $1\times10^8$ Pa, preferably $5\times10^7$ Pa or most preferably $1\times10^7$ Pa. An increased internal pressure may occur in the metering container during the metering process by the compression of the metering container by means of a plunger of the metering device. An increased internal pressure can likewise occur during the introduction of the liquid. Tightly sealing one or more openings by means of one or more closures at an aforementioned internal pressure of the container is therefore advantageous in that no liquid and/or food product and/or mixture of the liquid and the food product can escape from the opening(s) and/or the portion(s) even during the metering operation and/or introduction of the liquid. In the context of the present invention, the closure preferably comprises a check valve. A check valve is a component/valve that permits the flow of the liquid in one direction only. The check valve may preferably be a closable flap which is opened by the pressure of the liquid introduced into the metering container, but tightly reseals the metering container towards the outside after the end of the liquid supply due to the pressure being no longer present then.

Additionally or alternatively, the portion or at least one of the portions of the metering container preferably comprises an elastic membrane which tightly seals the metering container. The membrane is preferably configured such that it can be punctured by means of a device for introducing a liquid (such as, e.g., in particular a hollow needle) and is tightly sealed again once this device has been removed. In particular, it is preferred that the membrane is configured such that it tightly seals the metering container up to an internal pressure of up to $1\times10^8$ Pa, preferably $5\times10^7$ Pa or most preferably $1\times10^7$ Pa. Advantageously, the membrane tightly seals the metering container up to an internal pressure of up to $1\times10^8$ Pa, preferably $5\times10^7$ Pa or most preferably $1\times10^7$ Pa after the membrane has been punctured by a hollow needle having a diameter of up to 5 mm, preferably up to 4 mm and most preferably up to 3 mm. This is in particular also preferably the case even after the hollow needle has been removed.

If the metering container comprises more than one portion, these portions may all be provided at the first end, which comprises the metering outlet. It is also possible that all portions are arranged at the second end of the metering container, which is opposite the first end. Alternatively, there may also be at least one portion at both ends. In the case of more than one portion, all portions can comprise an above described opening (with the above described closure) or an above described elastic membrane. Likewise, however, a metering container according to the present invention can also comprise at least one opening according to the present invention and one elastic membrane according to the present invention.

The metering container preferably comprises a flexible wall having a wall thickness of 0.5 mm or less, preferably 0.2 mm or less and most preferably 0.1 mm or less. This flexible wall permits the metering container comprising the food product to be in a compressed state having a first volume prior to the introduction of the liquid and to assume an expanded state having a second volume, without considerable effort/pressure required, by the introduction of a liquid. The second volume is greater than the first volume. Preferably, the second volume is greater than the first volume at least by a factor of 2. preferably at least by a factor of 3 and most preferably at least by a factor of 5. Preferably, the food product fills at least 60%, at least 70%, at least 80%, at least 90% of the first volume. Preferably, the region of the metering container having the flexible wall is compressed in the compressed state in such a way that it is almost or completely free from air or gas. It is contemplated that the metering container (in particular the region having the flexible wall) is folded and/or rolled up in its compressed state. The exclusion of air or gas to the greatest possible extent or the complete exclusion of air or gas can prolong the shelf life of the food product and/or prevent that upon the introduction of a liquid an overpressure builds up which can entail that the metering container bursts and/or that a food product, liquid and/or mixture of a liquid and a food product escapes or leaks.

A further advantage of the flexible wall is that it permits the metering container in which the food product is contained to be compressed during the metering operation (e.g., upon the introduction of the liquid) without great additional force and effort. Besides, the flexible wall and thus also the food product and/or the mixture of the food product and the liquid in the metering container can have a contact over as large an area as possible with the inner surface of the cylinder of the metering unit for accommodating the metering container also after compression by the plunger of a plunger metering device/plunger metering system.

In the case of tube-shaped metering containers known in the art, in contrast to a metering container according to the present invention, such a flexible deformation is not possible. Thus, such metering containers inflexibly bend. This entails that uniform metering, emptying the metering container to an extent as complete as possible as well as sufficient heat transfer in the case of contact heating of the metering container via a heat source on the inner side of the cylinder of the metering system are not possible in the case of a metering system comprising a plunger.

In order to ensure uniform metering, sufficient emptying and/or tempering, the metering container according to the present invention should preferably exhibit a flexural strength of 50 mN or less, more preferably of 30 mN or less and most preferably of 10 mN or less in the region of the flexible wall. According to the present invention, the flexural strength is determined on the basis of DIN EN ISO 178 (cf. FIG. 9). The gap width (26) is 35 mm, the plastic strip (27) of the metering container used for the measurement has a size of 60×10 mm. By means of a wedge (25) moving downwards at a rate of 1 mm/s at 20° C. (temperature of the overall measuring system and the environment), being made of aluminum and having a height of 30 mm and a width and length at the upper side of 15 mm each, the maximum force necessary for a deformation of the plastic strip in the course of a penetration depth of 20 mm is determined (flexural strength in mN).

Furthermore, the flexible wall of the metering container should preferably have the shape of a tube or cylinder.

Some mixtures of a food product and an introduced liquid exhibit too high a viscosity and/or do not get sufficiently mixed at normal ambient temperature (about 20° C.). Thus, a metering operation is not possible without increasing the temperature of these food products. Furthermore, it is in some cases intended to temper the food product, liquid and/or mixture of the food product and the liquid for the later consumption.

For the purpose of such applications, the heat conductivity of the flexible wall of the metering container should preferably be higher than 0.1 W/m K. more preferably higher than 0.15 W/m K and most preferably higher than 0.2 W/m K. These heat conductivities permit a fast and sufficient heat transfer from the heating elements to the food products without undesirably long preheating times of longer than 20 min from 20 to 35° C.

The metering container comprises at its first end a metering outlet which advantageously can be configured as a metering tip. The first end is preferably the lower end of the metering container after installation in a plunger metering system. The food product is metered by the metering device through this metering outlet. In order to permit the food product to be precisely metered, the metering outlet preferably comprises an opening cross-sectional area of 8 mm$^2$ or less, preferably of 6 mm$^2$ or less, most preferably of 3 mm$^2$ or less. A metering tip can be either permanently fixed to the metering opening or snapped onto the metering opening.

When the metering tip has too large a volume and/or is too long, a tempered mixture of a food product and a liquid perhaps undesirably cools in the metering tip during the metering operation or during short metering breaks to such an extent that the viscosity gets disadvantageously high and the metering operation therefore has to be interrupted.

Therefore, the metering tip should preferably be selected so as to be as short as possible in particular, e.g., in the case of food products which have to be tempered for decreasing their viscosity. The length of the metering tip measured from the lower side of the stabilizing portion should be 20 mm or less, preferably 10 mm or less and most preferably 5 mm or less.

Preferably, the metering outlet can be tightly sealed with a metering closure. A preferred metering closure is adapted to subsequently seal the metering outlet tightly again after the removal of the metering closure.

Advantageously, the metering outlet is surrounded by a stabilizing portion. The stabilizing portion is preferably a stabilizing grommet. This grommet is most preferably circular. The stabilizing portion counteracts the pressure of the plunger onto the metering container and thus the food product or mixture of the food product and the introduced liquid.

Preferably, the second end of the metering container, which is opposite the first end (comprising the metering outlet), also comprises a stabilizing portion. The stabilizing portion is preferably a stabilizing grommet. This grommet is most preferably circular.

In other words, the invention is also directed to a metering container, wherein the metering container comprises a second end opposite the first end and wherein a stabilizing portion is comprised at the first end and/or at the second end. This stabilizing portion is preferably a stabilizing grommet. This grommet is most preferably circular.

Preferably, the materials to be selected for the metering container are plastics from the group of polyethylenes, polypropylenes and polyacetates, wherein also a combination of the different mentioned plastics may be advantageous. In particular, the absence of plasticizers which may be transferred into food products, the suitability for pasteurization or even sterilization as well as the weldability and the ability to be adhered are advantageous according to the present invention.

The flexible wall of the metering container and/or the stabilizing portion(s) and/or the metering tip preferably can also be made of the plastics polyethylene, polypropylene or polyacetate as well as combinations of these plastics. The individual components can be tightly connected to each other via welding or adhesion. Preferably, the flexible wall of the metering container, the stabilizing portion as well as the metering tip consist of plastic or a plastic combination. The flexural stiffness of the different components is adjusted in a defined manner by the selection of different material thicknesses. It is in particular preferred that the flexural strength of the flexible wall is smaller/lower than the flexural strength of the metering tip and/or of the stabilizing portion at the first end and/or at the second end.

In the context of the present invention, the flexible wall of the metering container can likewise comprise a first material (in particular one of the aforementioned materials or mixtures thereof), and the metering tip and/or the stabilizing portion at the first and/or the second end can comprise a second material (in particular one of the aforementioned materials or mixtures thereof). It is preferred that the flexible wall of the metering container consists of a first material (in particular one of the aforementioned materials or mixtures thereof), and/or the metering tip and/or the stabilizing portion at the first and/or the second end consists of a second material (in particular one of the aforementioned materials or mixtures thereof). However, it is likewise conceivable that the flexible wall of the metering container, the metering tip and the stabilizing portion comprise three different materials, preferably consist of three different materials.

A large volume of the metering container entails a prolonged heating time in the case of food products (or, after the addition of the liquid, mixtures of the food product and the liquid) that are tempered. Additionally, a very large volume also calls for a large design and mass of the metering system/metering device. Accordingly, a 3D printer and a printhead would then also have to be configured very largely. Moreover, the large mass requires great forces in the acceleration and deceleration phases during the printing operation. Therefore, the volume of the metering container should preferably be 500 ml or less, more preferably 200 ml or less and most preferably 100 ml or less. The volume mentioned here is the inner volume of the metering container in the expanded state. Thus, it relates to the maximum volume that can be contained in the metering container. As described above, the metering container can initially also be present in a compressed state having a smaller volume that is mostly restricted to the volume of the food product. This compressed volume can be achieved, e.g., by folding and/or rolling up the region of the metering container comprising the flexible wall.

Preferably, the metering container has a data portion which comprises data related to the food product contained in the metering container. These data may be in particular data on the kind of the liquid to be introduced, on the amount of the liquid to be introduced, on the necessary metering temperature and/or on the maximum metering speed. The data portion can comprise a mechanical code, a QR code or an RFID chip or a combination thereof for saving the aforementioned food product data. These indications ensure the user an automatedly successful result of the metering operation. In particular, the data portion may be adapted to be read out by the metering device according to the present invention.

As already mentioned above, the metering container according to the present invention can preferably have different volume states. In particular, the metering container is preferably to be characterized in that it can comprise a compressed state having a first volume and an expanded state having a second volume. In this context, the volume is the inner volume of the metering container in its respective state. In its compressed state, the metering container is preferably in a folded state. This is in particular made possible by the flexible wall. Preferably, the first volume of the metering container (i.e., in its compressed state) is essentially completely filled with the food product contained in the metering container. The food product preferably fills at least 60%, 70%, 80%, 90% of the first volume (i.e. in the compressed state). Higher volume proportions of the food product are preferred. Preferably, the second volume (i.e., in the expanded state) is greater than the first volume (i.e., in the compressed state) preferably at least by a factor of 2, preferably at least by a factor of 3 and most preferably at least by a factor of 5. The second volume is restricted by the maximum inner volume of the metering container. Furthermore, there is as little air and/or gas as possible in the metering container in its compressed state. Preferably the expansion of the volume from the compressed state to the expanded stale is achieved by the introduction of a liquid. The flexibility of the wall can be particularly advantageous in this context because it permits that the metering container can assume its expanded volume by the introduction of the liquid despite the compressed state. If the compressed state is achieved by folding the metering container via the flexible wall, the introduction of the liquid leads preferably to partial and/or complete unfolding of the metering container depending on the amount of liquid introduced.

The metering container according to the present invention may preferably also comprise a means supporting the intermixture of the food product and the introduced liquid. Such a means is advantageous for a fast and/or homogeneous mixture of the food product and the introduced solution. Preferably, this means comprises elements specifically influencing the flow of the liquid and/or the mixture of the food product and the liquid. Advantageously, the elements disturb the flow of the liquid and/or the mixture of the food product and the liquid, i.e., in other words, the elements prevent the flow of the liquid and/or the mixture of the food product and the liquid. A static mixer in the region of the metering outlet of the metering container can be used, for example, as such a means/mixing means. Such a static mixer may be, for example, blades in the region of the metering outlet and/or the metering tip.

An improved intermixture of the food product with the introduced liquid can be likewise achieved with a metering container in that the metering container is deformed during the metering operation by means of the plunger of the metering device. The deformation results in mechanical forces that are transferred to the liquid and/or the mixture of the food product and the liquid and thus generate a flow that enhances the intermixture of the food product with the solution. Therefore, the metering container according to the present invention is preferably characterized in that the second end (which is opposite the first end comprising the metering outlet) is flexible to such an extent that it can be deformed by a mechanical force of the plunger of the metering device. Preferably, the metering container is configured such that its second end is deformable by a cone-shaped and/or convex plunger. The deformation preferably occurs in the direction of the first end. It is furthermore preferred that the deformation is complementary to the shape of the plunger. A metering container that additionally comprises a first end (comprising the metering outlet) whose shape is complementary to the plunger of the metering device used is particularly advantageous. Such a complementary shape of the first end has the advantage that less residues of the food product and/or mixture of the food product and the liquid and/or liquid remain in the plunger at the end of the metering operation.

The metering container according to the present invention contains a food product that is preferably powdery, solid or flowable. A flowable food product is preferably a liquid, pasty or viscous food product. The metering container can also contain mixtures of more than one food product. Mixtures of solid, powdery and/or flowable food products can be contained in the metering container. Preferably the food products in such mixtures all have the same state of matter, wherein the state of matter is selected from solid, powdery and flowable (i.e., liquid, pasty or viscous).

Preferred food products in the context of the present invention are solid or powdery food products. Most preferred are powdery food products. Among the group of solid food products, in particular food products comprising a water content are preferred. Preferably, the water content of a solid food product in the context of this invention is at least 5%, preferably at least 10% and most preferably at least 15%. The powder of the powdery food products used in the context of this invention preferably consists of a porous material. The inner surface of a powder is defined via the entirety of all surfaces contained in the powder, i.e., also the surface that is between the powder grains.

What is meant by a porous material in the context of the present invention is substances or mixtures that have a minimum particle size of 15 µm, preferably 20 µm, most preferably 50 µm, and whose density is below 2 g/cm$^3$, preferably below 1.5 g/cm$^3$, most preferably below 1 g/cm$^3$.

The minimum particle size at a low density entails a large inner surface of the powder grains. A large inner surface that is preferred according to the present invention enables a fast diffusion of the liquid into the interior of the powder and/or the powder grains. A liquid having an increased viscosity, preferably a viscosity of at least 100 mPas, most preferably a viscosity of at least 500 mPas and most preferably of at least 1000 mPas, is then formed by the bond to the powder and the associated swelling thereof. Subsequently, this increased viscosity, on the one hand, reduces the risk that a disintegration of the suspension of the liquid and the powder can occur after the elimination of the liquid flow. On the other hand, this higher viscosity is particularly suitable for a successful and/or precise food product printing process.

Furthermore, in the context of the present invention, a powdery food product is preferably characterized in that after the addition of a liquid as defined in this invention a mixture of the food product and the liquid having a viscosity of higher than 100 mPas, preferably higher than 500 mPas and most preferably higher than 1000 mPas is formed within 100 seconds. Preferably, the dynamic viscosity is determined via the process of the rotational viscometry: The determination is performed according to DIN 53019-1:2008 09 (Viscometry—Measurement of viscosities and flow curves by means of rotational viscometers) at a temperature of 20° C. and a speed of 10 rpm.

The metering container according to the present invention preferably comprises additionally a filter unit. In the context of this invention, a filter unit is a device permitting the mechanical filtration of a liquid, i.e., a device by means of which the solid components such as, e.g., particles in a liquid can be reduced or eliminated when the liquid passes through the device. In this connection, the liquid is preferably the liquid that is to be introduced into the metering container. Filter units containing a sterile filter are particularly advantageous. Such a sterile filter has a pore size that is adapted to filter microorganisms from the liquid. The pore size of such a sterile filter can be, for example, 0.5 µm or less, preferably 0.2 µm or less and most preferably 0.1 µm or less. In other words, a filter unit is preferred that is adapted to filter particles and/or cells from a liquid. In this connection, cells are preferably microorganisms.

In the context of the present invention, particles are products that are not completely soluble and therefore dispersed or suspended in a liquid. These products can preferably be an undissolved organic or inorganic material such as, for example, salts or plastic particles.

Preferably, the filter unit is arranged such that the liquid introduced into the metering container previously flows though this filter unit. This prevents that particles and/or microorganisms are introduced into the metering container. The risk of undesired contaminations via the introduced liquid and/or contaminations with microorganisms is thereby reduced. It is thus preferred that the portion or at least one of the portions of the metering container comprises the filter unit.

The metering container according to the present invention implies various technical advantages over the prior art (partly only in the case of preferred embodiments). A closed metering container comprising a powder as content involves the advantage over the food product components conventionally used that the food product contained therein is microbiologically lightly sealed, which minimizes the bacterial load and considerably improves the shelf life and storability of the food product due to the low water content. The metering outlet which is closed prior to the first use and/or a closed portion for the introduction of the liquid particularly accounts for this advantage.

For the introduction of a liquid and the subsequent precise metering of the mixture of the food product and the liquid contained in the metering container once the liquid has been introduced, the metering container can be mounted in a metering device for food products according to the present invention.

In the context of the present invention, what is meant by a metering device is preferably a device into which the metering container can be placed and which meters the food product out of a metering outlet by means of pressure of, e.g., a movable plunger onto the metering container. In the context of this invention, the metering device is additionally characterized in that it comprises a means which is adapted to introduce a liquid into the metering container.

This metering device may comprise a cylinder for accommodating the metering container and a plunger which is movably supported in the cylinder and adapted to compress a metering container accommodated in the cylinder. This can be realized by means of a motor which is connected to the plunger and adapted to move the plunger in the cylinder. Furthermore, the metering device according to the present invention comprises a means which is adapted to introduce a liquid into the metering container.

Thus, the present invention is directed to a metering device for food products comprising a cylinder for accommodating a metering container for food products and a plunger which is movably supported in the cylinder and adapted to compress a metering container which is accommodated in the cylinder, wherein the metering device comprises a motor which is connected to the plunger and adapted to move the plunger in the cylinder, and wherein the metering device comprises a means which is adapted to introduce a liquid into the metering container.

The motor is preferably arranged within the cylinder in the plunger. In metering systems known so far, the motor is arranged above or outside the cylinder and usually connected via a gear or a toothed belt to a feed means which moves the plunger. Alternatively, the motor could also be arranged directly with the feed means above the cylinder. In this case, however, the motor necessarily would have to be additionally fixed since it would move along with the feed means upwards and downwards in the course of the metering operation. This would lead to a disadvantageous increase in weight and volume of the upper part of the metering means.

The arrangement of motor within the plunger according to the present invention thus permits advantageously the implementation of a more compact design of the metering unit and a more simple structure of the overall metering system.

The feed means according to the present invention is preferably rotated by means of the motor. The feed means engages with a fixedly mounted counterpart such that a rotation of the feed means moves the plunger in the cylinder. The lid in which the fixedly mounted counterpart is secured is fixed by a tight connection to the cylinder.

The feed means preferably comprises a first thread while the fixedly mounted counterpart preferably comprises a second thread meshing with the first thread. According to the present invention, the feed means can preferably be a screw or threaded bolt while the fixedly mounted counterpart is preferably a screw nut.

A reduction gear can be arranged between the motor and the feed means, wherein the feed means is preferably in the middle of the plunger in order to ensure a uniform movement of the plunger within the cylinder.

In order to prevent a rotation of the plunger around the feed means while the motor is running, the plunger is locked in the lid via a connection.

Exact metering of the food product and/or a mixture of the food product and the liquid is particularly well possible if the strand of the food product that escapes from the metering outlet because of the pressure of the plunger onto the metering container due to the rotation of the motor can be quickly interrupted. Due to the usually high viscosity of the food product and/or the mixture of the food product and the liquid, this is possible, for example, when the food product is slightly retracted into the metering opening by means of a slight underpressure from the top. This can be achieved according to the present invention, i.a., when the plunger is mounted into the cylinder according to the present invention such that it separates the spaces above and below the cylinder from each other in an airtight manner. Accordingly, it is preferred that the outside of the plunger engages with the inside of the cylinder in an airtight manner. To this end, for example, a seal, preferably a sealing ring, may be provided between the outside of the plunger and the inside of the cylinder.

The metering device according to claim 18, 19 or 20, wherein the first end of the metering container and/or the metering outlet is removably attached to the inside of the cylinder and/or to an edge portion of the cylinder. Additionally, the region around the metering opening is preferably closed by means of the metering device in an airtight manner once the metering container has been mounted in the metering device. Accordingly, it is preferred that the first end of the metering container engages with the inside of the cylinder and/or an edge portion or the cylinder in an airtight manner. To this end, for example, a seal, preferably a sealing ring, may be provided between the first end of the metering container and the inside of the cylinder and/or an edge portion of the cylinder. The seal is preferably attached to the inside of the cylinder and/or to an edge portion of the cylinder.

An underpressure which slightly retracts the food product through the metering opening can then be generated in the region of the metering container by a reversal of the sense of rotation of the motor and by the upward movement of the plunger caused thereby.

As already explained, the temperature of the food products and/or mixture of the food products and the liquid contained in the metering container can be modified to some extent, e.g., in order to decrease the viscosity such that the food products can be metered or in order to enhance the intermixture of the liquid and the food products. According to the present invention, this can be realized by means of a healing element that tempers the metering container and is preferably arranged at the inside of the cylinder of the metering device. It is generally also conceivable that the heating element is arranged such that it tempers the liquid to be introduced into the metering container before it is introduced. Thus, in the case of a metering device comprising a liquid storage, the heating element can be arranged such that it tempers the liquid contained in the liquid tank. When there is a liquid inlet, the heating element can also be arranged such that the liquid is tempered in this liquid inlet. It is also possible in the context of the present invention, that the means that is adapted to introduce a liquid into the metering container can contain the heating element.

Preferably, the heating element can be configured as a heating strip, heating film or heating wire as well as of combinations of these heating elements. The temperature of the metering container and thus the food product contained therein can be continuously measured by means of a temperature sensor arranged in the cylinder at the metering container. When the heating element is used to temper the liquid, as described above, a temperature sensor can be arranged depending on the position of the heating element. Preferably, the liquid tank, the liquid inlet and/or the means for introducing the liquid into the metering container can comprise a temperature sensor. Preferably, the same component comprises a heating element and a temperature sensor.

Tempering is particularly advantageous in the case of a food product and/or a mixture of a food product and a liquid to be metered that requires a defined metering temperature and/or requires a defined temperature control for achieving optimum metering results. Exemplary food products are chocolate or jelly fruits, which can be optimally metered at temperatures slightly above the gelling or solidifying temperature. Mixtures for which tempering is particularly advantageous are food products whose flowability increases at an increased temperature such as, for example, chocolate and other food products having a high content of fat, sugar-containing products such as chewing masses, marzipan, fondant, jelly products or all food products comprising gelling or thickening agents. Such marches of temperature or the adjustment of defined temperatures can be achieved with a control means for controlling the heating element depending on the measured temperature.

This information, such as exemplarily the required metering temperatures or marches of temperature, the optimum metering speed, the selection of the liquid(s) to be introduced, the temperature of the liquid to be introduced, the amount of the liquid to be introduced, the time between the introduction of the liquid into the metering container and the beginning of the metering operation, or also the flow rate at which the liquid is introduced into the metering container, can be stored in a data portion at or on the metering container. These data can be captured by means of sensors in the metering device and the optimum metering speed can be adjusted by means of a control means via the motor causing the movement of the plunger via the feed means. As already mentioned, this control means can preferably additionally also control the adjustment of specific temperatures or marches of temperature. Furthermore, the control means can preferably also control the selection of the liquid to be introduced and/or the amount of the liquid and/or the temperature of the liquid which is introduced into the metering container. In the case of metering containers comprising openings with a closure as a portion, the control means can preferably control the opening and/or closing of the opening with the closure. Likewise, die control means can preferably control the opening and/or closing of the metering closure at the metering outlet. It is, for example, possible to control the time between the inlet of the liquid and the beginning of the metering outlet.

When the metering device comprising the metering container is installed into a 3D printer or another positioning device such as exemplarily a robot arm. the control unit can additionally ensure the communication between the metering device and the 3D printer or the positioning unit with respect to, for example, the metering speed depending on the positioning speed or an interruption of the metering operation depending on the positioning or on the generation of a required temperature signal, liquid introduction signal or metering signal for the 3D printer or the positioning device.

Thus, such a metering device can be advantageously used without a significant modification of the software of the 3D printer or the positioning unit.

In order to achieve optimum metering results, the metering device itself is preferably moved in all three dimensions by means of the positioning means when the metering device is installed in a 3D printer or another positioning unit. Thus, the metering substrate such as exemplarily a plate does not have to be moved during the metering process. In contrast to 3D positioning systems in which the metering substrate usually must be moved during the metering process in one or two directions for the generation of 2D or 3D structures, in the system according to the present invention in particular fragile food product objects are not subjected to potentially destroying mechanical load resulting from a movement of the metering substrate during the metering process.

The structures formed in the course of a metering process often consist of several individual objects of different food products. In order to be able to achieve an economical metering operation in respect of time, several positioning systems comprising metering devices are combined in physical proximity according to the present invention. The metering substrate is preferably carried by a transport system from one positioning system to the next according to the food products to be metered. This can be performed according to the present invention either by a conveyor belt or by movable transport platforms. Thus, a faster production of even complex structures consisting of several food products on one metering substrate is advantageously possible.

What is meant by a movable transport platform in the context of the present invention is preferably a member onto which a metering substrate can be placed and which can be moved between the 3D printers, for example, by means of a wheel drive, air cushion drive or another drive. The system is preferably an autonomously moving system.

The information with respect to the food product(s) to be printed can be stored according to the present invention on the metering substrate or the transport system by means of a data portion. This information enables the transport system to calculate the optimum path between the different positioning systems and the individual positioning systems can read out the shape and kind of the object to be printed by means of a sensor.

The data portion can be preferably either a mechanical code, a bar code, a QR code, an RFID chip or a combination thereof.

The metering device according to the present invention comprises, i.a., a means adapted to introduce a liquid into the metering container. Preferably, this means comprises a liquid inlet and/or a liquid storage. A liquid storage can store a defined amount of liquid. The liquid storage has a volumetric capacity of preferably 1000 ml or less, more preferably 700 ml or less and most preferably 500 ml or less. As described above, the liquid storage preferably can be heated. This heating can be effected by a heating element that is arranged at and/or in the liquid storage. Preferably the liquid storage consists of a material that contains no plasticizers and/or other substances that are not intended to migrate into the stored liquid. Preferably, the liquid storage consists of plastic from the group of polyethylenes, polypropylenes and polyacetates, wherein also a combination of the different mentioned plastics may be advantageous. In particular, the absence of plasticizers which may migrate into the liquid and thus into the mixture of the food product and the liquid to be metered is preferred.

The liquid storage is preferably connected to the means of the metering device according to the present invention such that the liquid is guided from the liquid storage to the means in order to be used there for the introduction into the metering container. Preferably, a pump is provided to this end.

The metering device according to the present invention may also comprise a liquid inlet. Such a liquid inlet connects the metering device to an external source for the liquid, preferably to a conduit system providing the liquid. As an example, a tube system is mentioned that connects the metering device to a water tap. Preferably, the liquid inlet directly supplies the liquid into the means of the metering device.

The means of the metering device according to the present invention preferably comprises one or at least one liquid outlet. Preferably, this liquid outlet is adapted to introduce liquid into a metering container according to the present invention. It is in particular contemplated that the liquid outlet can introduce a defined amount of the liquid into the metering container. Advantageously, the liquid outlet additionally is automatically actuatable. Preferably, it is controlled by the control unit.

If the metering device is provided for, i.a., the use of metering containers according to the present invention, wherein the portion or at least one of the portions of the metering container comprises an opening, the liquid outlet of the means is preferably adapted to engage with the opening. A liquid outlet which engages with the opening such that the metering container is tightly sealed against the environment before and/or while the liquid is introduced into the metering container is particularly preferred. This is in particular aimed at preventing microbial contamination and thus increasing the shelf life of the food product and/or the mixture of the food product and the liquid.

If the metering device is provided for, i.a., the use of metering containers according to the present invention, wherein the portion or at least one of the portions of the metering container comprises an elastic membrane lightly sealing the metering container, the liquid outlet of the means preferably comprises a hollow needle that is adapted to puncture the membrane. The hollow needle should in particular be adapted to puncture the membrane such that the membrane can be tightly resealed provided that the hollow needle is removed. The hollow needle preferably has a diameter of up to 5 mm, preferably up to 4 mm and most preferably up to 3 mm.

The liquid outlet of the means in the metering device according to the present invention can be arranged, for example, at the end of the plunger of the metering device. The end is preferably the end of the plunger that gets into contact with the metering container. In order to ensure the complete introduction of the liquid from the metering device into the metering container, the liquid outlet of the metering device is preferably adapted to be connected in a liquid-tight manner to the portion of the metering container. This can be exemplarily ensured by the installation of a seal or the use of a membrane that ensures a liquid-tight closure between the hollow needle and the metering container.

The liquid outlet can likewise be also arranged such that it can interact with the first side (comprising the metering outlet) of the metering container.

A preferred metering device in the context of the present invention comprises a means containing a filter unit. In the context of the present invention, a filter unit is a device that permits the mechanical filtration of a liquid, i.e., a device by means of which the solid components such as, e.g., particles are filtered front a liquid. In this context, the liquid is preferably the liquid to be introduced into the metering container. Filter units containing a sterile filter and/or an activated carbon filter are particularly advantageous. In other words, a filter unit that is adapted to filter particles and/or cells from a liquid is preferred. In this context, cells are preferably microorganisms. A sterile filter according to the present invention preferably comprises a pore size of 0.5 µm or less, preferably 0.2 µm or less and most preferably 0.1 µm or less.

Basically, the filter unit can be arranged at any position in the unit that permits that the liquid has to run completely through the filter unit. Advantageously, the filter unit is to be arranged in the unit directly in front of and/or after the metering outlet. In this way, it can be ensured that the liquid introduced into the metering container introduces as few microorganisms and/or particles as possible into the metering container.

The metering device according to the present invention, preferably along with a three-dimensional positioning system, constitutes a 3D printer that should be capable of forming structures from the homogeneous mixture of the food product and the liquid by precise metering and defined positioning of the metering outlet in space. Most preferably, a flexible production of various components on a metering substrate can be made possible by the combination of a plurality of 3D printers which arc each equipped with a metering device and a metering container.

The integration of the metering device and/or metering container according to the present invention into a 3D printer which enables the metering device to be freely positioned in space permits the creation of complex three-dimensional structures of the homogeneous mixtures of a powder and a liquid, preferably food products, in a way that had not been possible with conventional techniques.

This is all the more true for a combination of a plurality of 3D printers comprising the metering device and/or metering container according to the present invention for metering different or a plurality of the same food product components in parallel, wherein the metering substrates onto which the food products are metered are preferably guided flexibly to the various 3D printers by means of a transport system.

The integration of the metering device and/or metering container according to the present invention into a 3D printer which enables the metering device to be freely positioned in space permits the creation of complex three-dimensional structures of food products, in particular for mixtures of a food product or food products and a liquid or liquids in a way that had not been possible with conventional techniques.

This is all the more true for a combination of a plurality of 3D printers comprising the metering device and/or metering container according to the present invention for metering different or a plurality of the same food product components and/or mixtures of food products and liquids in parallel, wherein the metering substrates onto which the food products are metered are preferably guided flexibly to the various 3D printers by means of a transport system.

A preferably provided coding system involves a further advantage because with its aid the food product containers arrive at the right 3D printers by means of the transport system and with its aid the 3D printers obtain the information about the food product to be printed. Additionally, the coding system can contain, for example, the kind, amount, temperature and/or introduction flow rate of the liquid.

The present invention further relates to a 3D printing system comprising a metering device according to the present invention. Preferably, the printing system further comprises a heating means adapted to heal the printed food product and/or mixture after escaping from the metering outlet. Preferably, the heating means enables heating to at least 60° C., more preferably at least 80° C., even more preferably at least 100° C., even more preferably at least 150° C., in order to refine and/or bake the food product.

The present invention further relates to a method for metering food products. The method comprises the following steps: (a) providing a metering device for food products comprising a cylinder for accommodating a metering container for food products, and a plunger movably supported in the cylinder and adapted to compress a metering container accommodated in the cylinder, wherein the metering device comprises a motor connected to the plunger and adapted to move the plunger in the cylinder; (b) introducing a metering container for food products, wherein the metering container contains a food product; (c) introducing a liquid into the metering container; (d) moving the plunger of the metering device by means of the motor of the metering device such that the metering container is compressed so that a mixture of the food product and the liquid escapes from the metering outlet.

The definitions introduced in connection with the metering device and metering container according to the present invention apply mutatis mutandis in connection with the method according to the present invention.

Preferably, the metering device provided in step (a) of the metering method comprises and/or is a metering device according to the present invention. Generally, all embodiments of the metering device described herein can be used.

It is likewise preferred that the metering container comprises and/or is a metering container according to the present invention. Again, all metering containers described herein can generally be used.

Preferably, in the method according to the present invention, a metering container according to the present invention is used that comprises a compressed state having a first volume and an expanded state having a second volume. In this context, the volume is the inner volume of the metering container in its respective state. In its compressed state, the metering container is preferably in a folded state. This is in particular made possible by the flexible wall. Preferably, the first volume of the metering container (i.e., in its compressed state) is essentially completely filled with the food product contained in the metering container. The food product preferably fills at least 60%, 70%, 80%, 90% of the first volume (i.e., in the compressed state). Higher volume proportions of the food product are preferred. Preferably, the second volume (i.e., in the expanded state) is greater than the first volume (i.e., in the compressed state) preferably at least by a factor of 2, preferably at least by a factor of 3 and most preferably at least by a factor of 5. The second volume is restricted by the maximum inner volume of the metering container. Furthermore, there is as little air and/or gas as possible in the metering container in its compressed state. Preferably, the expansion of the volume from the compressed state to the expanded state is achieved by the introduction of a liquid. The flexibility of the wall can be in particular advantageous in this context because it permits that the metering container can assume its expanded volume by the introduction of the liquid despite its compressed state. If the compressed state is achieved by folding the metering container via the flexible wall, the introduction of the liquid leads preferably to partial and/or complete unfolding of the metering container depending on the amount of liquid introduced.

What is in particular preferred is the method according to the present invention wherein a metering container according to the present invention is used that comprises a compressed state having a first volume and an expanded state having a second volume and wherein the metering container is in its compressed state in step (b) and in its expanded state during and/or after step (c). In this context, the expansion of the volume is due to the liquid introduced.

It is generally conceivable that the liquid is already introduced into the metering container before it is introduced into the metering device. Consequently, step (c) can be carried out before step (b) in the method according to the present invention. However, it is preferred that the metering container is introduced into the metering device before the liquid is introduced, i.e., step (c) is carried out after step (b).

In the method according to the present invention, step (c), i.e. the introduction of the liquid(s) into the metering container, is preferably carried out by means of the metering device, preferably the metering device according to the present invention. The introduction of only one liquid is preferred. However, it is also possible to introduce a plurality of liquids into the metering container. Preferably, all liquids are introduced in step (c).

In the method according to the present invention, the introduction of a liquid or liquids into the metering container in step (c) can take place before step (d), i.e. before the plunger of the metering device is moved by means of the motor of the metering device such that the metering container is compressed so that a mixture of the food product and the liquid escapes from the metering outlet. In other words, step (d) can be carried out subsequently to step (c). This means that in such a method the liquid is first completely introduced into the metering container before the mixture of the food product and the liquid is metered.

Preferably, there may be a defined period of time between these two steps, i.e., steps (c) and (d). In this defined period of time, the metering container can preferably be tempered. Preferably, the tempering operation is implemented by a heating element of the metering device. Such a period of time can likewise be used for mixing the introduced liquid and the food product. Preferably, the mixing operation comprises the use of a means which is contained in the metering container and effects an intermixture of the liquid and the food product. In this context, preferably a metering container according to the present invention is used which comprises a means for mixing the liquid and the food product.

In the context of the method according to the present invention, steps (c) and (d) can also take place simultaneously. Steps (c) and (d) can likewise take place iteratively. In this case, preferably, first step (c) is performed and then step (d). In particular, steps (c) and (d) can be carried out alternatingly several times. In such a method, preferably a metering container according to the present invention is used that comprises at its first end (i.e., the end comprising the metering outlet) the portion or at least one of the portions adapted to introduce a liquid into the metering container. In this case, it is in particular preferred that the portion or at least one of the portions is provided at the metering outlet.

Furthermore, a method for metering food products according to the present invention can also comprise the following step: reading out a data portion provided at the metering container by means of a sensor provided at the metering device. Preferably, the data portion is read out after the termination of steps (a) and (b) and before the beginning of steps (c) and (d).

Additionally, a method according to the present invention can also comprise the following step: controlling the motor on the basis of the information read out from the data portion by a control means provided in the metering device. The metering process can be controlled via such a step. For example, the metered amount of the mixture of the food product and the liquid and/or the metering speed can be controlled by means of this step.

Furthermore, the method according to the present invention can comprise the following step: tempering the metering container by means of a heating element provided in the metering device. The method can likewise comprise a step in which a liquid storage and/or a liquid inlet contained in the metering device is tempered via a heating element provided in the metering device. It is also conceivable that the method contains a step in which the means adapted to introduce a liquid into the metering container is tempered by means of a heating element provided in the metering device. Preferably, the heating element is controlled in the aforementioned steps by a control means provided in the metering device. This control preferably is based on the information read out from the mentioned data portion.

A defined amount of liquid is preferably introduced in step (c) of the method according to the present invention. The amount of the liquid is restricted by the inner volume of the metering container. The liquid is preferably introduced in step (c) such that the food product and the liquid get uniformly mixed. Preferably, this can be either effected via the liquid flow or mechanically by moving the plunger.

The method according to the present invention preferably comprises a further step which comprises the following: controlling the kind of the liquid introduced and/or controlling the amount of the liquid and/or controlling the temperature of the liquid via a heating element provided in the metering device on the basis of information read out from the data portion by a control means provided in the metering device.

What is meant by a mixture in the context of the present invention is in particular a mixture of a food product and a liquid, solution, suspension, foam, emulsion, dispersion and/or combination thereof. Preferably, a mixture, in particular the mixture of the food product and the liquid, is homogeneous.

In the context of the present invention, a homogeneous mixture is a mixture of different substances whose mass ratio differs at any place of the mixture in 0.5 cm$^3$ by less than 50%, preferably 30%, most preferably by less than 20%.

Furthermore, the mixture of a food product and a liquid in the context of the present invention preferably exhibits a viscosity of $10^7$ or less, preferably $5\times10^6$ mPas or less and most preferably $10^6$ mPas or less. Preferably, the dynamic viscosity is determined via the process of the rotational viscometry: The determination is performed according to DIN 53019-1:2008-09 (Viscometry—Measurement of viscosities and flow curves by means of rotational viscometers) at a temperature of 20° C. and a speed of 10 rpm.

Advantageously, the liquid is introduced in step (c) of the method according to the present invention at a flow rate that is sufficient to intermix the liquid and the food product homogeneously by the flow.

What is meant by a homogenous intermixture in the context of the present invention is an intermixture that results in a homogeneous mixture according to the present invention.

The method according to the present invention can further comprise the following step: moving the plunger in order to intermix the liquid and the food product. Preferably, a metering device according to the present invention is used which comprises a non-planar, e.g. cone-shaped and/or convex, plunger. Moreover, a metering container according to the present invention is preferably used which is deformable at its second end by the plunger. Preferably, a deformation of the metering container by the plunger of the metering device becomes a mechanical force which is transferred to the liquid in the container and thus leads to the intermixture of the food product and the introduced liquid.

In the method according to the present invention, in particular also a metering container whose portion adapted for the introduction of a liquid comprises an elastic membrane may be employed. Preferably, a metering device is used in this context which comprises a hollow needle for the introduction of the liquid. In a method according to the present invention using such a metering container, step (c) preferably comprises the substeps of puncturing the membrane with the hollow needle and introducing the liquid through the hollow needle.

Preferably, the hollow needle is subsequently removed again and the membrane preferably exhibits the property to be tightly sealed again thereafter. Alternatively, the hollow needle can also remain in the metering container and the food product, liquid and/or mixture of the food product and the liquid can be prevented from escaping from the metering container via the hollow needle by applying a counterpressure.

In other words, the present invention is directed to a method according to the present invention, wherein the metering container comprises one or at least one portion according to the present invention which comprises an elastic membrane, wherein the metering device comprises a hollow needle for introducing the liquid and wherein step (c) comprises the following: (c1) puncturing the membrane with the hollow needle; and (c2) introducing the liquid through the hollow needle. Preferably, the hollow needle does not get into contact with the food product contained in the metering container. Preferably, this method further comprises step (c3): retracting the hollow needle from the membrane, wherein the membrane gets tightly sealed again. The hollow needle can be retracted before step (d) of the method. Likewise, the hollow needle can be retracted after step (d) of the method.

The definition of the food product in context with the metering container applies mutatis mutandis to the method for metering a food product. Hence, the metering method is preferably a method in which the food product contained in the metering container is powdery. As described above, the powdery food product preferably consists of a porous material.

Preferably, the plunger in step (a) of the metering method according to the present invention is adapted to expand a metering container accommodated in the cylinder. In particular, the plunger should be adapted thereto after the metering container has already been partly compressed. This property is particularly advantageous for a metering operation with the present metering method to be as precise as possible because via such an expansion the uncontrolled flow continuation of the mixture of the food product and the liquid is reduced and/or prevented when the metering process is interrupted. Thus, the method according to the present invention additionally comprises a step of expanding the metering container after step (d) so that no further mixture continues to flow out of the metering outlet. Hence, after an interruption of the metering process, the food product and/or mixture of the food product and the liquid to be metered should preferably be completely removed from the metering tip by reversing the sense of rotation of the plunger of a plunger metering system.

The metering container according to the present invention is preferably completely closed prior to its installation into the metering device in order to ensure a sufficient shelf life by the protection of the powder against microbial contamination or oxygen admission.

The manual or automated generation of 2D or 3D food product forms or shapes on the basis of individual food product ingredients or food products as well as mixtures of these two is an application possibility for the metering device according to the present invention, the method for metering food products according to the present invention and the metering container according to the present invention. In order to change the flowability of the food product, the temperature of the metering container can preferably be modified and/or controlled after its introduction into the metering device.

The metering device preferably along with a positioning system forms a 3D printer that should be capable of forming structures from the homogeneous mixture of a powder and a liquid by means of precise metering and defined positioning of the metering outlet in space. It is particularly preferred that a flexible production of different components is made possible on one substrate by the combination of a plurality of 3D printers which are each equipped with a metering device and a metering container.

Furthermore, the printing system preferably comprises a heating means that is adapted to heat the printed food product or the printed mixture after its escape from the metering outlet. Preferably the heating means permits heating to at least 60° C., more preferably at least 80° C., even more preferably at least 100° C., even more preferably at least 150° C., in order to refine and/or bake the food product. Accordingly, the method according to the present invention can further comprise the step of heating the applied mixture of the food product and the liquid. The heating step is preferably performed by means of the described heating means.

The mixture of the powder and the liquid is preferably a flowable, i.e., liquid, viscous or pasty food product mixture. In order to modify the flowability of the food product, the temperature of the metering container can be preferably modified and/or controlled after its introduction into the metering device. The manual or automated generation of 2D or 3D food product forms or shapes on the basis of individual food product ingredients or food products as well as mixtures of these two are application possibilities for the metering device and the metering container according to the present invention.

The present invention is directed, i.a., to the following aspects:

1. A metering container for food products, wherein the metering container comprises a flexible wall having a wall thickness of 0.5 mm or less and a first end comprising a metering outlet, wherein the metering container contains a food product, and wherein, in addition to the metering outlet, at least one portion is provided that is adapted for the introduction of a liquid into the metering container.

2. The metering container according to aspect 1, wherein the portion or at least one of the portions is provided at the first end.

3. The metering container according to aspect 1 or 2, wherein the metering container comprises a second end, which is opposite the first end, and wherein the portion or at least one of the portions is provided at the second end.

4. The metering container according to any one of the preceding aspects, wherein the portion or at least one of the portions comprises an opening.

5. The metering container according to aspect 4, wherein the opening is tightly sealed with a closure.

6. The metering container according to aspect 5, wherein the closure can be removed and/or opened for the introduction of a liquid.

7. The metering container according to aspect 6, wherein the closure is adapted to reseal the opening after the removal of the closure.

8. The metering container according to any one of aspects 5 to 7, wherein the closure is configured such that it tightly seals the opening up to a pressure inside the metering container of up to $1\times10^8$ Pa, preferably $5\times10^7$ Pa and most preferably $1\times10^7$ Pa.

9. The metering container according to any one of aspects 5 to 8, wherein the closure comprises a check valve.

10. The metering container according to any one of the preceding aspects, wherein the portion or at least one of the portions comprises an elastic membrane which tightly seals the metering container.

11. The metering container according to aspect 10, wherein the elastic membrane is configured such that it is tightly resealed upon puncturing with a hollow needle and the subsequent removal of the hollow needle at a pressure within the metering container of up to $1\times10^8$ Pa, preferably $5\times10^7$ Pa and most preferably $1\times10^7$ Pa.

12. The metering container according to aspect 11, wherein the elastic membrane is configured such that it does not deform at a pressure within the metering container of up to $1\times10^8$ Pa, preferably $5\times10^7$ Pa and most preferably $1\times10^7$ Pa.

13. The metering container according to any one of the preceding aspects, wherein the wall thickness of the flexible wall is 0.3 mm or less, preferably 0.2 mm or less and most preferably 0.1 mm or less.

14. The metering container according to any one of the preceding aspects, wherein the metering outlet comprises an opening cross-sectional area of 8 mm$^2$ or less, preferably 6 mm$^2$ or less, most preferably of 4 mm$^2$ or less.

15. The metering container according to any one of the preceding aspects, wherein the flexural strength of the flexible wall is 50 mN or less, preferably of 30 mN or less and most preferably of 10 mN or less.

16. The metering container according to any one of the preceding aspects, wherein the metering outlet is tightly sealed with a metering closure.

17. The metering container according to aspect 16, wherein the metering closure is adapted to tightly reseal the metering outlet after the removal of the metering closure.

18. The metering container according to any one of the preceding aspects, wherein the metering outlet is configured as a metering tip.

19. The metering container according to any one of the preceding aspects, wherein the metering container comprises a second end, which is opposite the first end, and wherein a stabilizing portion is configured at the first end and/or at the second end, said stabilizing portion preferably comprising a stabilizing grommet or plate which is most preferably circular.

20. The metering container according to aspect 18 or 19, wherein the flexural strength of the flexible wall is lower than the flexural strength of the metering tip and/or of the stabilizing portion at the first end and/or second end.

21. The metering container according to any one of aspects 18 to 20, wherein the flexible wall comprises a first material, preferably consists of the first material, and the metering tip and/or the stabilizing portion at the first and/or the second end comprises a second, different material, preferably consists of the second material.

22. The metering container according to aspect 21, wherein the first and/or second material comprises one or a combination of the following materials: polypropylene, polyethylene, polyacetate.

23. The metering container according to any one of the preceding aspects, wherein the metering container has the shape of a tube or cylinder.

24. The metering container according to any one of the preceding aspects, wherein the inner volume of the metering container is between 5 ml and 500 ml, preferably between 10 ml and 200 ml, most preferably between 20 ml and 100 ml.

25. The metering container according to any one of the preceding aspects, further comprising a data portion comprising data on the food product contained in the metering container.

26. The metering container according to any one of the preceding aspects, wherein the data portion comprises a mechanical code, a bar code, a QR code, an RFID chip or a combination thereof.

27. The metering container according to any one of the preceding aspects, wherein the metering container comprises a means which aids in the intermixture of the food product and the liquid.

28. The metering container according to aspect 27, wherein the means is provided at and/or in the metering outlet.

29. The metering container according to aspect 27 or 28, wherein the means comprises elements which specifically influence the flow of the liquid and/or the mixture of the food product and the liquid.

30. The metering container according to aspect 29, wherein the elements disturb or prevent a laminar flow in the metering outlet.

31. The metering container according to any one of aspects 27 to 30, wherein the portion or at least one of the portions is provided in the vicinity of and/or at the metering outlet.

32. The metering container according to any one of the preceding aspects, wherein the food product is powdery, solid and/or flowable.

33. The metering container according to aspect 32, wherein the powder consists of a porous material.

34. The metering container according to aspect 32 or 33, wherein the powder comprises particles having a minimum particle size of 15 μm, preferably 20 μm, most preferably 50 μm, and wherein the powder has a density below 2 $g/cm^3$, preferably below 1.5 $g/cm^3$, most preferably below 1 $g/cm^3$.

35. The metering container according to any one of the preceding aspects, wherein the metering container comprises a filter unit.

36. The metering container according to aspect 35, wherein the filter unit is adapted to filter particles and/or cells from liquids.

37. The metering container according to aspect 36, wherein the cells are microorganisms.

38. The metering container according to any one of the preceding aspects, wherein the metering container comprises a compressed state having a first volume and an expanded state having a second volume.

39. The metering container according to aspect 38, wherein the first volume is essentially completely filled with the food product contained in the metering container.

40. The metering container according to aspect 39, wherein the food product fills at least 60%, 70%, 80%, 90% of the first volume.

41. The metering container according to any one of aspects 38 to 40, wherein the second volume is greater than the first volume at least by a factor of 2, preferably at least by a factor of 3 and most preferably at least by a factor of 5.

42. A metering device for food products comprising a cylinder for accommodating a metering container for food products and a plunger which is movably supported in the cylinder and adapted to compress a metering container accommodated in the cylinder, wherein the metering device comprises a motor which is connected to the plunger and adapted to move the plunger in the cylinder and wherein the metering device comprises a means which is adapted to introduce a liquid into the metering container.

43. The metering device according to aspect 42, wherein the means comprises a liquid inlet and/or a liquid storage.

44. The metering device according to aspect 42 or 43, wherein the means comprises at least one liquid outlet adapted to introduce a liquid into a metering container as defined in aspects 1 to 41.

45. The metering device according to aspect 44, wherein the portion or at least one of the portions of the metering container comprises an opening and wherein the liquid outlet of the means is adapted to engage with the opening.

46. The metering device according to aspect 44, wherein the portion or at least one of the portions of the metering container comprises an elastic membrane which tightly seals the metering container and wherein the liquid outlet comprises a hollow needle which is adapted to puncture the membrane.

47. The metering device according to any one of aspects 44 to 46, wherein the liquid outlet is automatically actuatable.

48. The metering device according to any one of aspects 44 to 47, wherein the liquid outlet is arranged at the end of the plunger.

49. The metering device according to any one of aspects 42 to 48, wherein the means comprises a filter unit for filtering the liquid.

50. The metering device according to aspect 49, wherein the filler unit removes particles and/or cells from the liquid.

51. The metering device according to aspect 50, wherein the cells are microorganisms.

52. The metering device according to any one of aspects 42 to 51, wherein the end of the plunger is non planar, preferably convex and/or cone-shaped.

53. The metering device according to any one of aspects 42 to 52, wherein the motor is arranged within the cylinder.

54. The metering device according to any one of aspects 42 to 53, further comprising a feed means which can be rotated by means of the motor.

55. The metering device according to aspect 54, wherein the feed means engages with a fixedly mounted counterpart such that a rotation of the feed means moves the plunger in the cylinder.

56. The metering device according to aspect 55, wherein the feed means comprises a first thread and the counterpart comprises a second thread meshing with the first thread.

57. The metering device according to aspect 56, wherein the feed means comprises a screw or threaded bolt and the counterpart a screw nut.

58. The metering device according to any one of aspects 42 to 57, further comprising a heating element for heating the metering container.

59. The metering device according to aspect 58, wherein the heating element is arranged at the inside of the cylinder.

60. The metering device according to aspect 58 or 59, wherein the heating element comprises a heating strip.

61. The metering device according to any one of aspects 58 to 60, further comprising a temperature sensor for measuring the temperature of the metering container.

62. The metering device according to aspect 55, further comprising a control means for controlling tire heating element depending on the measured temperature.

63. The metering device according to any one of aspects 42 to 62, further comprising a sensor for capturing a data portion located at the metering container.

64. The metering device according to aspect 63, wherein the sensor comprises a bar code reader, a QR code reader, a microswitch, an RFID receiver or a combination thereof.

65. The metering device according to aspect 63 or 64, further comprising a control means adapted to control the motor and optionally the heating element depending on the data captured by means of the sensor.

66. The metering device according to any one of aspects 42 to 65, wherein the outside of the plunger engages with the inside of the cylinder in an airtight manner.

67. The metering device according to any one of aspects 42 to 66, wherein the cylinder contains a metering container for food products, preferably a metering container according to any one of aspects 1 to 41.

68. A 3D printer for 3D printing food products, comprising a metering device according to any one of aspects 42 to 67.

69. A method for metering food products, comprising the following steps:
(a) providing a metering device for food products, comprising a cylinder for accommodating a metering container for food products and a plunger movably supported in the cylinder and adapted to compress a metering container accommodated in the cylinder, wherein the metering device comprises a motor connected to the plunger and adapted to move the plunger in the cylinder:
(b) introducing a metering container for food products, wherein the metering container contains a food product;
(c) introducing a liquid into the metering container;
(d) moving the plunger of the metering device by means of the motor of the metering device such that the metering container is compressed so that a mixture of the food product and the liquid escapes from the metering outlet.

70. The method according to aspect 69, wherein the metering device provided in step (a) is a metering device according to any one of aspects 35 to 58.

71. The method according to aspect 69 or 70, wherein the metering container introduced in step (b) is a metering container according to any one of aspects 1 to 41.

72. The method according to aspect 71, wherein the metering container introduced in step (b) is a metering container according to any one of the aspects 38 to 41, wherein in step (b) the metering container is present in its compressed state and during and/or after step (c) the metering container is present in its expanded state.

73. The method according to any one of aspects 69 to 72, wherein step (c) is carried out after step (b).

74. The method according to any one of aspect 69 to 73, wherein step (c) is carried out by means of the metering device.

75. The method according to any one of aspects 69 to 74, wherein step (d) is carried out subsequently to step (c).

76. The method according to any one of aspects 69 to 75, wherein steps (c) and (d) are carried out simultaneously or iteratively in the order of first (c) and then (d).

77. The method according to any one of aspects 69 to 76, wherein steps (c) and (d) are carried out alternatingly several times.

78. The method according to any one of aspects 69 to 77, further comprising the step of: reading out a data portion provided at the metering container by means of a sensor provided at the metering device.

79. The method according to aspect 78, further comprising the step of: controlling the motor on the basis of the read out information by a control means provided in the metering device.

80. The method according to any one of aspects 69 to 79, further comprising the step of: heating the metering container by means of a heating element provided in the metering device.

81. The method according to aspect 80, further comprising the step of: controlling the heating element on the basis of the read out information by a control means provided in the metering device.

82. The method according to any one of aspect 69 to 81, wherein the mixture is a solution, suspension, foam, emulsion, dispersion and/or combinations thereof.

83. The method according to any one of aspects 69 to 82, wherein the mixture is homogeneous.

84. The method according to any one of aspects 69 to 83, wherein the mixture of the food product with the introduced liquid has a viscosity of $1 \times 10^7$ mPas or less, preferably $5 \times 10^6$ mPas or less and most preferably $1 \times 10^6$ mPas or less.

85. The method according to any one of the aspects 69 to 84, wherein the liquid is introduced in step (c) at a flow rate that is sufficient to intermix the liquid and the food product homogeneously by the flow.

86. The method according to any one of aspects 69 to 85, further comprising the step of: moving the plunger in order to intermix the liquid with the food product.

87. The method according to any one of aspects 69 to 86, wherein the metering container comprises an elastic membrane which tightly seals the metering container, wherein the metering device comprises a hollow needle for introducing the liquid and wherein step (c) comprises:
(c1) puncturing the membrane with the hollow needle; and
(c2) introducing the liquid through the hollow needle.

88. The method according to aspect 87, further comprising the step of: retracting the hollow needle from the membrane, wherein the membrane gets tightly sealed again.

89. The method according to aspect 88, wherein the retraction takes place before step (d).

90. The method according to aspect 88, wherein the retraction takes place after step (d).

91. The method according to any one of aspects 87 to 90, wherein the hollow needle does not get into contact with the food product.

92. The method according to any one of aspects 69 to 91, wherein the food product is powdery.

93. The method according to aspect 92, wherein the powder consists of a porous material.

94. The method according to aspect 92 or 93, wherein the powder comprises particles having a minimum particle size of 15 μm, preferably 20 μm, most preferably 50 μm, and wherein the powder has a density below 2 g/cm$^3$, preferably below 1.5 g/cm$^3$, most preferably below 1 g/cm$^3$.

95. The method according to any one of aspects 69 to 94, wherein the plunger in step (a) is adapted to expand a metering container accommodated in the cylinder.

96. The method according to aspect 95, wherein the metering container is expanded after step (d) so that no further mixture escapes from the metering outlet.

The present invention is further directed to, i.a., the following aspects, wherein the features of the following aspects 1 to 36 can also combined with the features according to the preceding aspects 1 to 96:

1. A metering container for food products, wherein the metering container comprises a flexible wall having a wall thickness of 0.5 mm or less and a first end having a metering outlet and wherein the metering container contains a food product.

2. The metering container according to aspect 1, wherein the wall thickness of the flexible wall is 0.3 mm or less, preferably 0.2 mm or less and most preferably 0.1 mm or less.

3. The metering container according to aspect 1 or 2, wherein the metering outlet has an opening cross-sectional area of 8 mm$^2$ or less, preferably 6 mm$^2$ or less and most preferably of 4 mm$^2$ or less.

4. The metering container according to any one of the preceding aspects, wherein the flexural strength of the flexible wall is 50 mN or less, preferably 30 mN or less and most preferably 10 mN or less.

5. The metering container according to any one of the preceding aspects, wherein the metering outlet is configured as a metering lip.

6. The metering container according to any one of the preceding aspects, wherein a stabilizing portion is configured at the first end, said stabilizing portion preferably comprising a stabilizing grommet or plate which is most preferably circular.

7. The metering container according to aspect 5 or 6, wherein the flexural strength of the flexible wall is lower than the flexural strength of the metering tip and/or of the stabilizing portion.

8. The metering container according to any one of aspects 5 to 7, wherein the flexible wall comprises a first material, preferably consists of the first material, and the metering tip and/or the stabilizing portion comprises a second, different material, preferably consists of the second material.

9. The metering container according to aspect 8, wherein the first and/or the second material comprises one or a combination of the following materials: polypropylene, polyethylene, polyacetate.

10. The metering container according to any one of the preceding aspects wherein the metering container has the shape of a tube or cylinder.

11. The metering container according to any one of the preceding aspects, wherein the inner volume of the metering container is between 5 ml and 500 ml, preferably between 10 ml and 200 ml, most preferably between 20 ml and 100 ml.

12. The metering container according to any one of the preceding aspects, wherein the food product contained in the metering container is in a pasty and/or flowable form.

13. The metering container according to any one of the preceding aspects, further comprising a data portion comprising data on the food product contained in the metering container.

14. The metering container according to aspect 13, wherein the data portion comprises a mechanical code, a bar code, a QR code, an RFID chip or a combination thereof.

15. A metering device for food products, comprising a cylinder for accommodating a metering container for food products, preferably a metering container according to any one of the preceding aspects, and a plunger which is movably supported in the cylinder and adapted to compress a metering container accommodated in the cylinder, wherein the metering device comprises a motor which is connected to the plunger and adapted to move the plunger in the cylinder.

16. The metering device according to aspect 15, wherein the motor is arranged within the cylinder.

17. The metering device according to aspect 15 or 16, farther comprising a feed means which can be rotated by means of the motor.

18. The metering device according to aspect 17, wherein the feed means engages with a fixedly mounted counterpart such that a rotation of the feed means moves the plunger in the cylinder.

19. The metering device according to aspect 18, wherein the feed means comprises a first thread and the counterpart comprises a second thread meshing with the first thread.

20. The metering device according to aspect 19, wherein the feed means comprises a screw or threaded bolt and the counterpart a screw nut.

21. The metering device according to any one of aspects 18 to 23, further comprising a heating element for heating the metering container.

22. The metering device according to aspect 21, wherein the heating element is arranged at the inside of the cylinder.

23. The metering device according to aspect 21 or 22, wherein the heating element comprises a heating strip.

24. The metering device according to any one of aspects 21 to 23, further comprising a temperature sensor for measuring the temperature of the metering container.

25. The metering device according to aspect 24, further comprising a control means for controlling the heating element depending on the measured temperature.

26. The metering device according to any one of aspects 15 to 25, further comprising a sensor for capturing a data portion located at the metering container.

27. The metering device according to aspect 26, wherein the sensor comprises a bar code reader, a QR code reader, a microswitch, an RFID receiver or a combination thereof.

28. The metering device according to aspect 26 or 27, further comprising a control means adapted to control the motor and optionally the heating element depending on data captured by means of the sensor.

29. The metering device according to any one of aspects 15 to 28, wherein the outside of the plunger engages with the inside of the cylinder in an airtight manner.

30. The metering device according to any one of aspects 15 to 29, wherein the cylinder contains a metering container for food products, preferably a metering container according to any one of aspects 1 to 14.

31. A 3D printer for 3D printing food products, comprising a metering device according to any one of aspects 15 to 29.

32. A method for metering food products, comprising the following steps:
   (a) providing a metering device according to any one of aspects 15 to 29;
   (b) introducing a metering container for food products, preferably a metering container according to any one of aspects 1 to 14, into the cylinder of the metering device; and
   (c) moving the plunger by means of the motor such that the metering container is compressed so that the food product escapes from the metering outlet.

33. The method according to aspect 32, further comprising the step of: reading out a data portion provided at the metering container by means of a sensor provided at the metering device.

34. The method according to aspect 33, further comprising the step of: controlling the motor on the basis of the read out information by a control means provided in the metering device.

35. The method according to aspect 33 or 34, further comprising the step of: heating the metering container by means of a heating clement provided in the metering device.

36. The method according to aspect 35, further comprising the step of: controlling the heating element on the basis of the read out information by a control means provided in the metering device.

Figure 2:
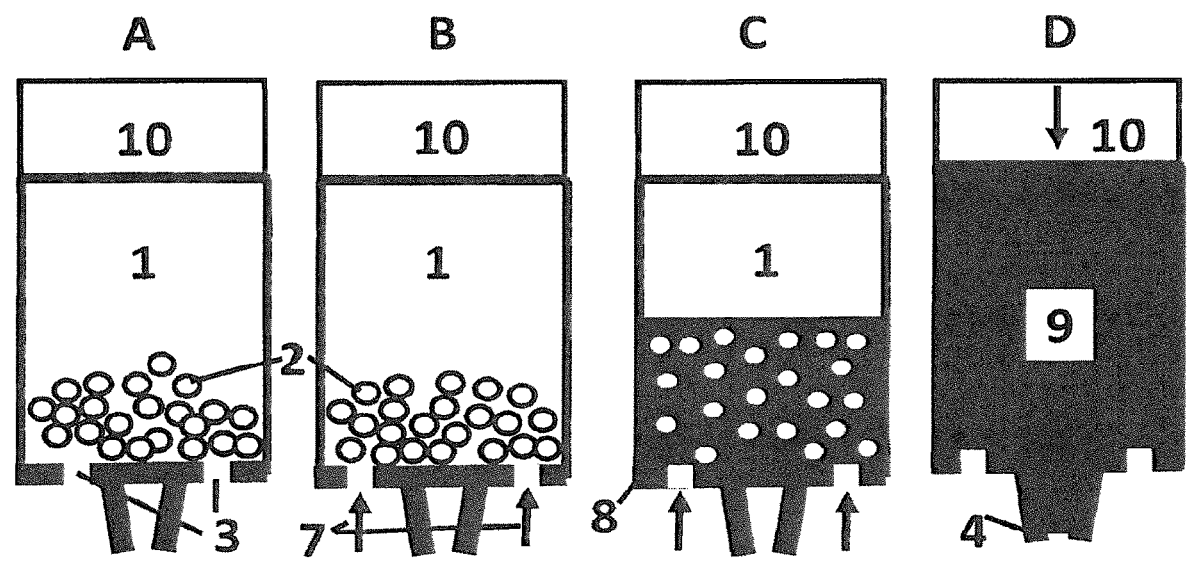
Figure 3:
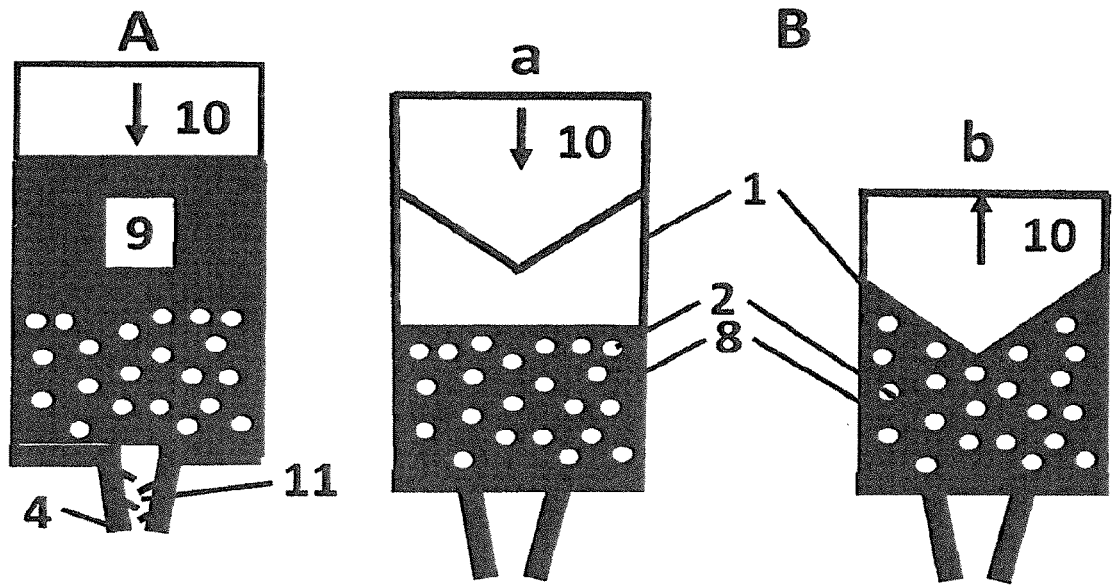
Figure 4:
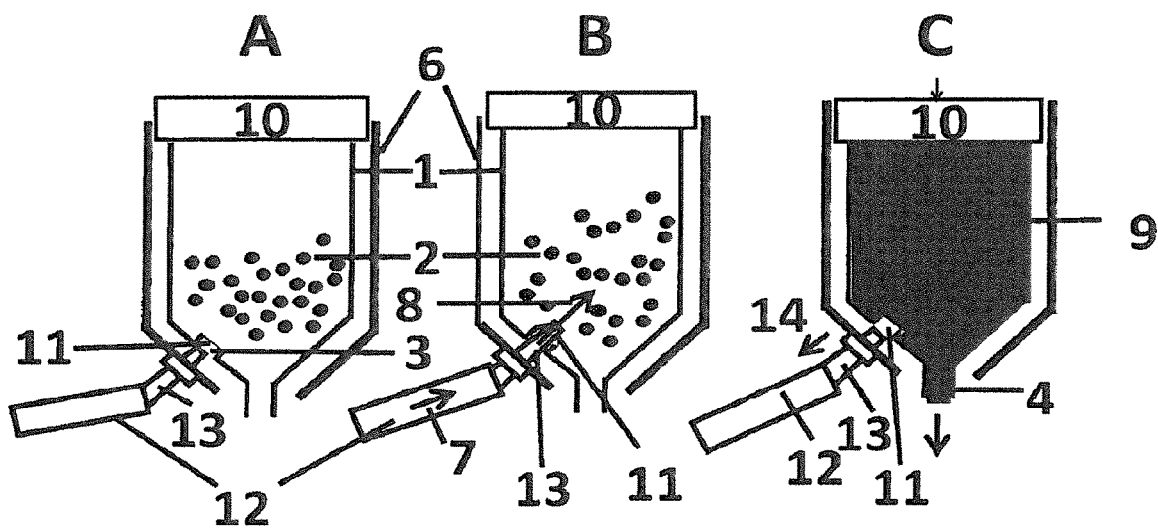
Figure 5:
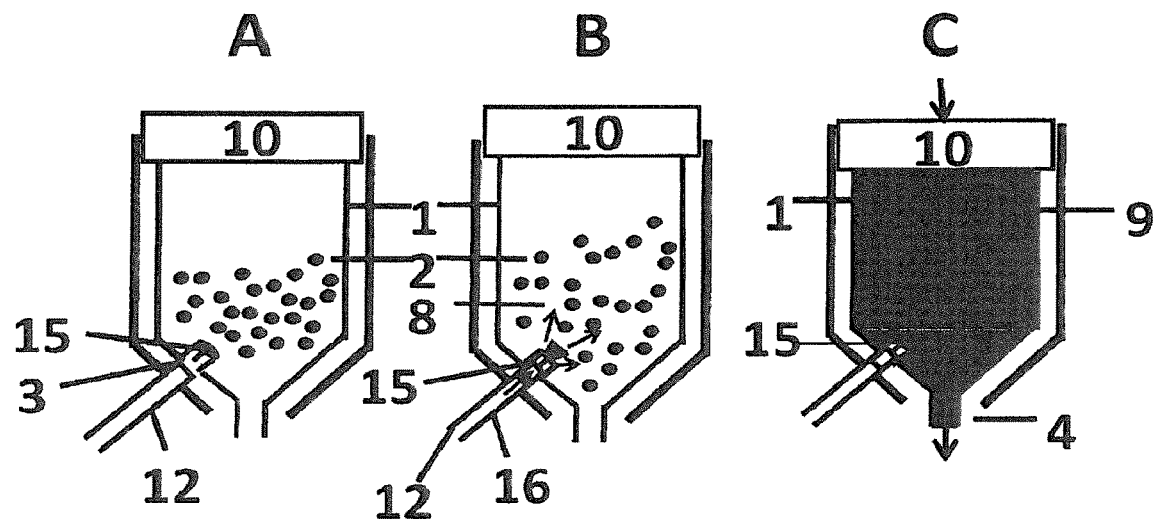
Figure 6:
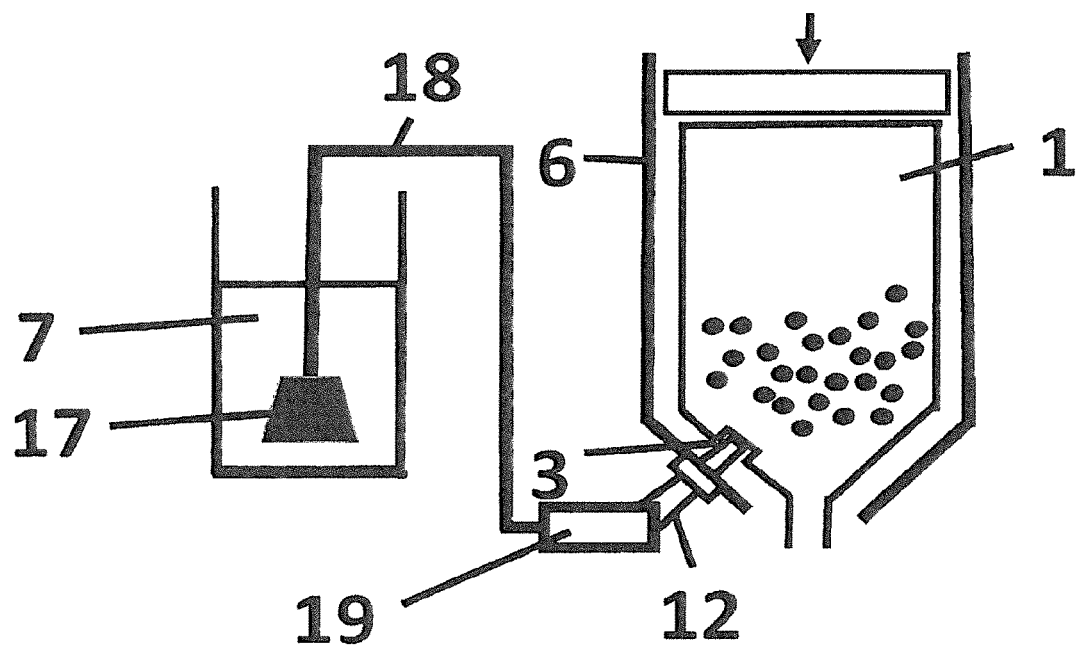
Figure 7:
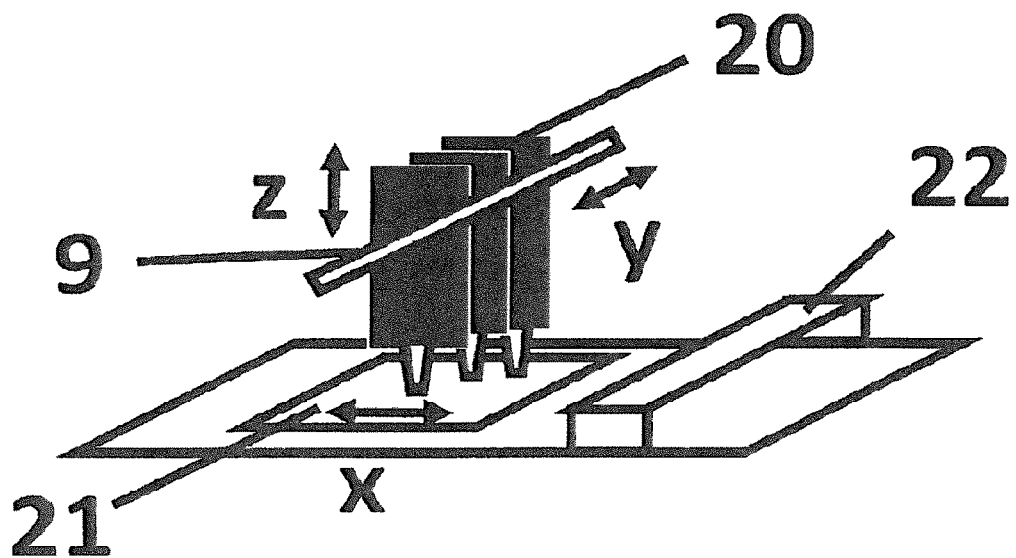
Figure 8:
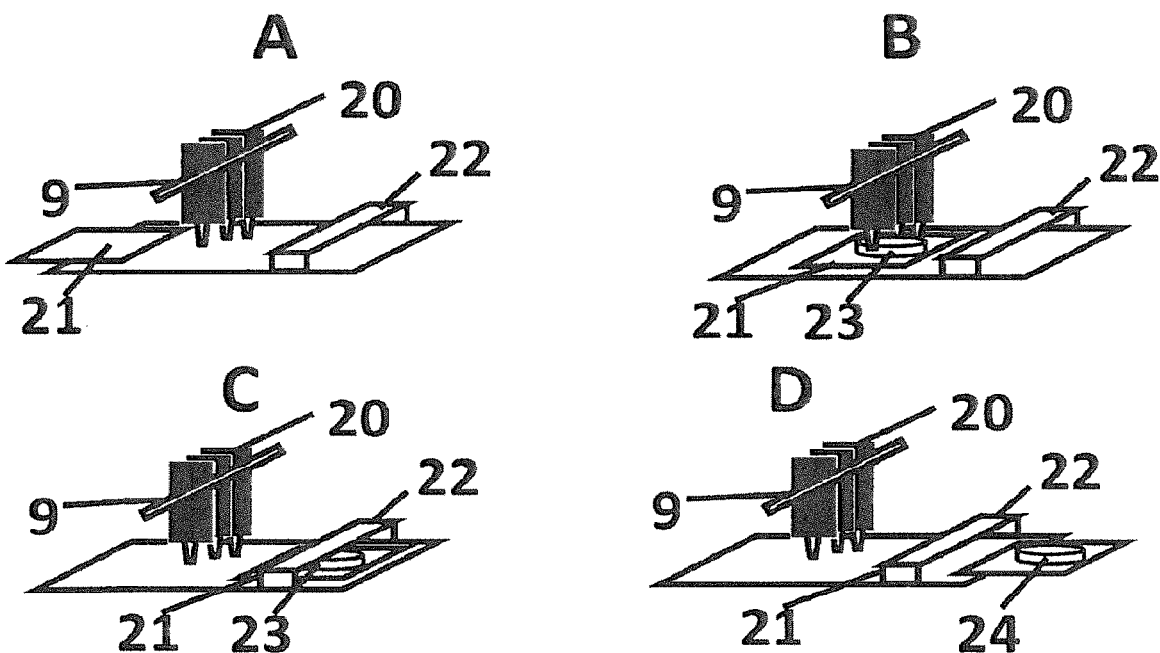
Figure 9:
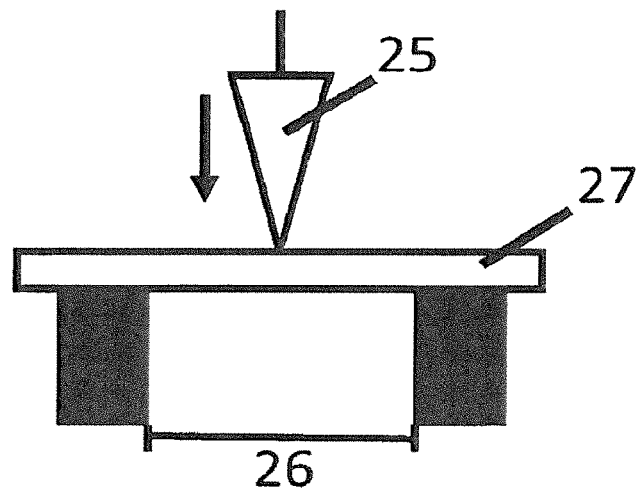

In the following, preferred embodiments of the invention are described in more detail in connection with the Figures, in which:

FIG. 1 shows various metering containers according to preferred embodiments of the present invention;

FIG. 2 schematically shows the metering operation according to a preferred embodiment of the present invention;

FIG. 3 exemplarily shows the mechanically supported mixing operation;

FIG. 4 schematically shows the introduction of the liquid via a portion comprising a membrane;

FIG. 5 schematically shows the introduction of the liquid via a check valve;

FIG. 6 schematically shows the supply of the liquid via a storage container and a filter;

FIG. 7 schematically shows a multiple printhead with a downstream heating unit;

FIG. 8 schematically shows the printing operation and the subsequent heating operation;

FIG. 9 schematically shows the set-up for the determination of the flexural strength on the basis of DIN EN ISO 178.

Figure 10:
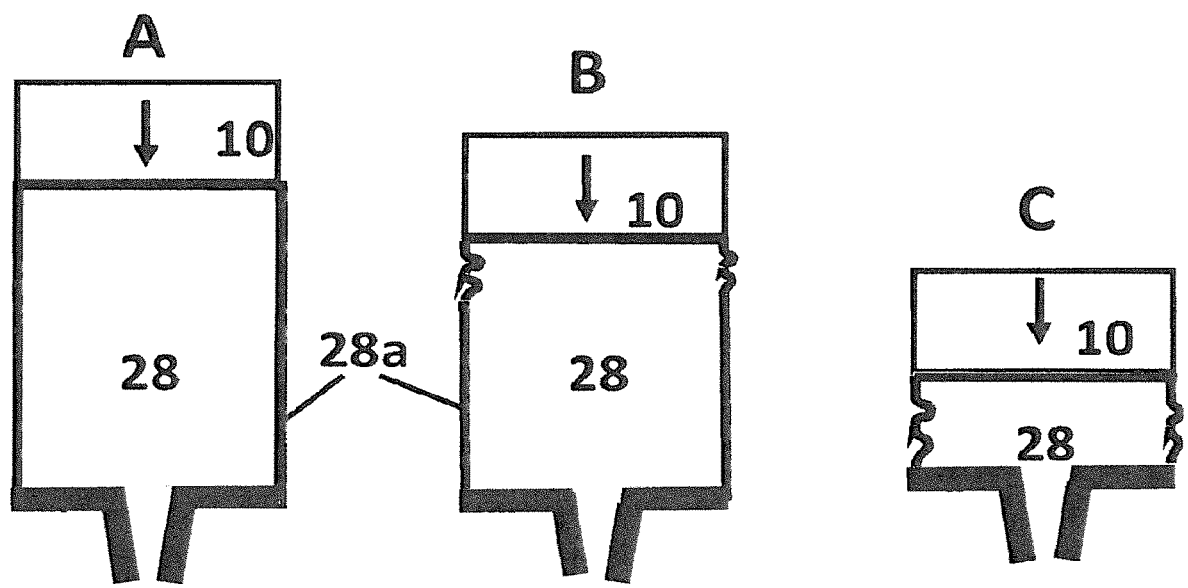
Figure 11:
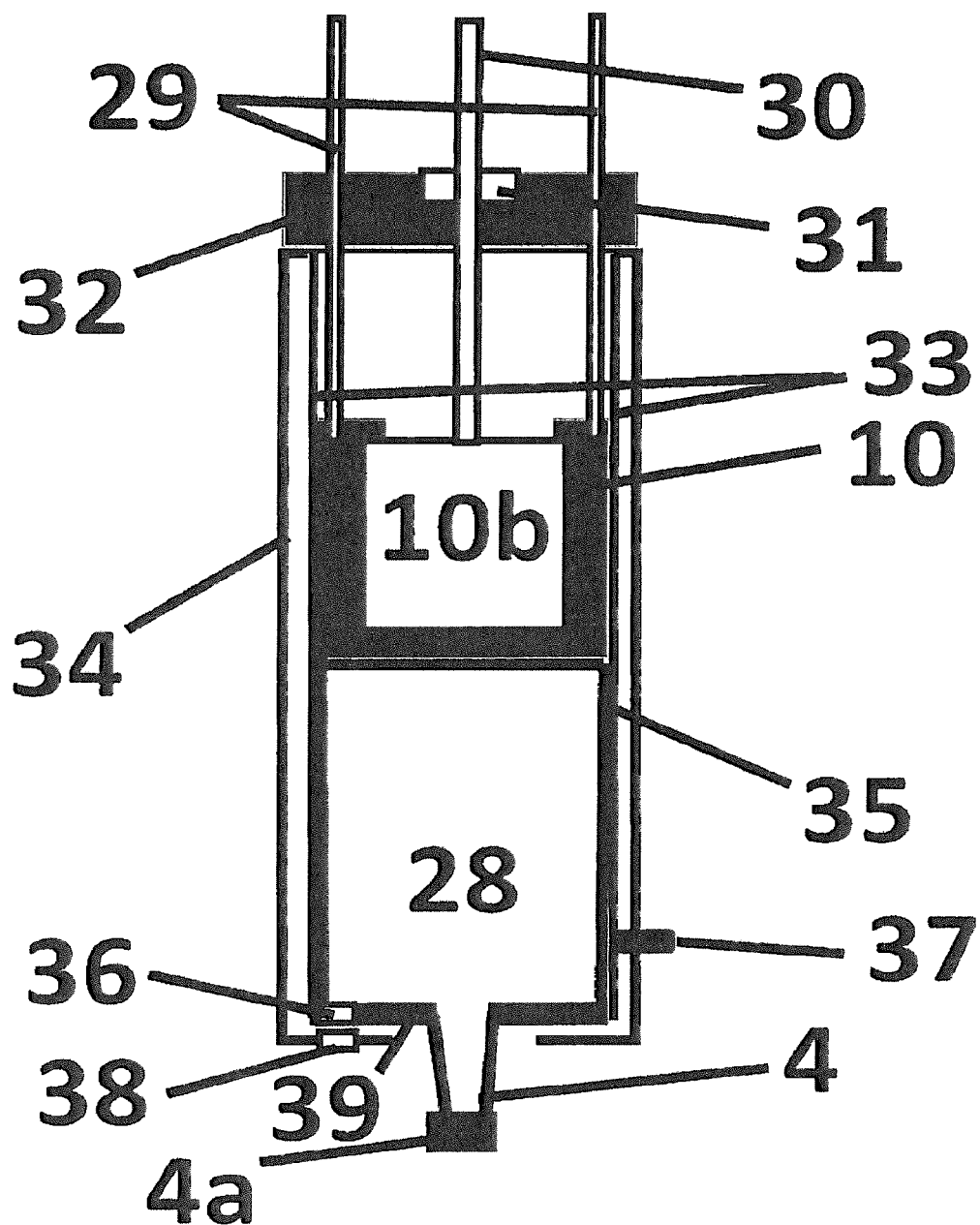
Figure 12:
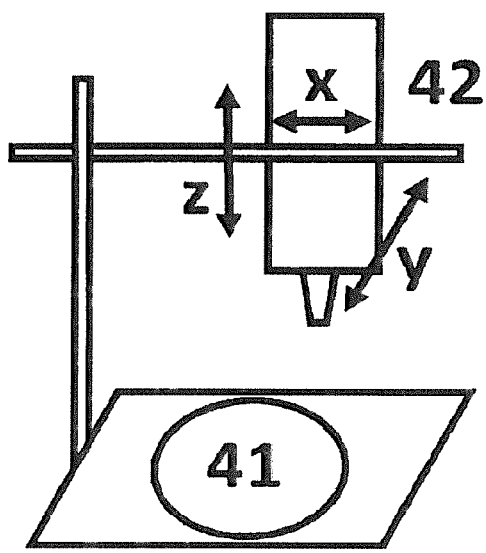
Figure 13:
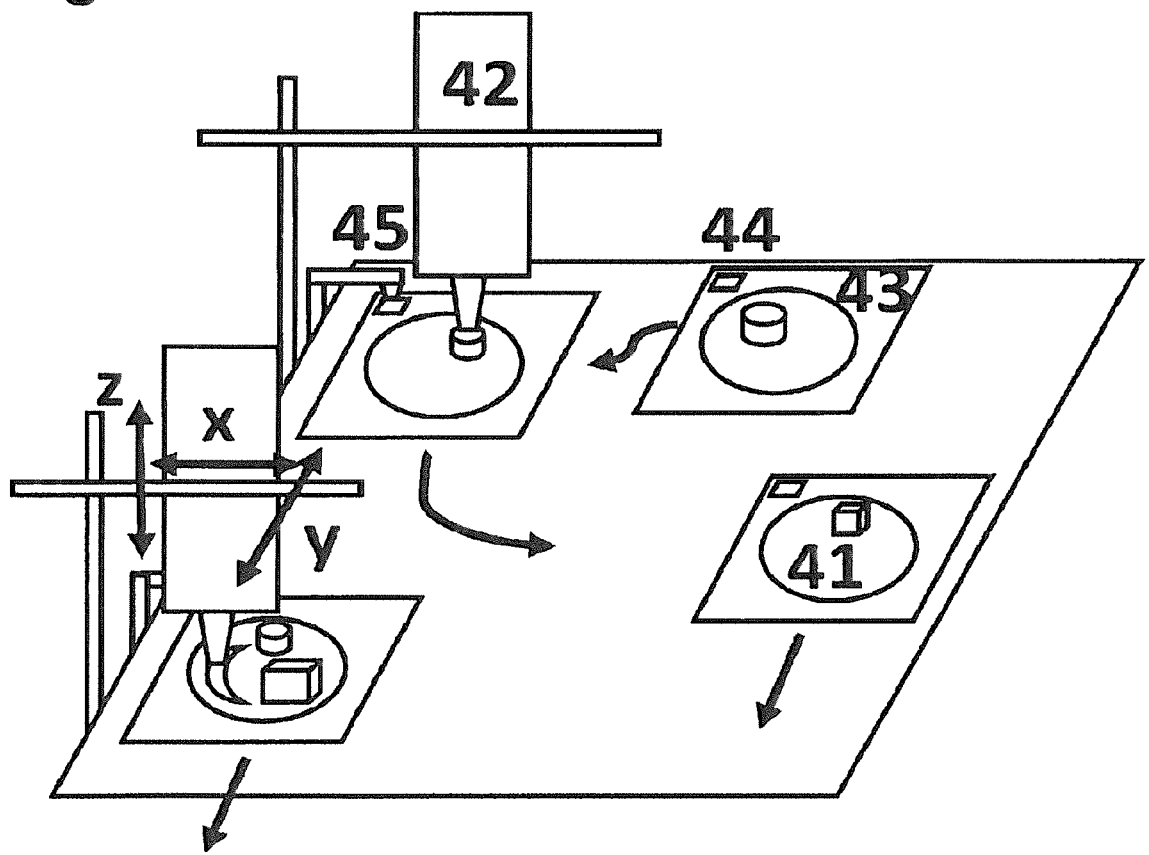
Figure 14:
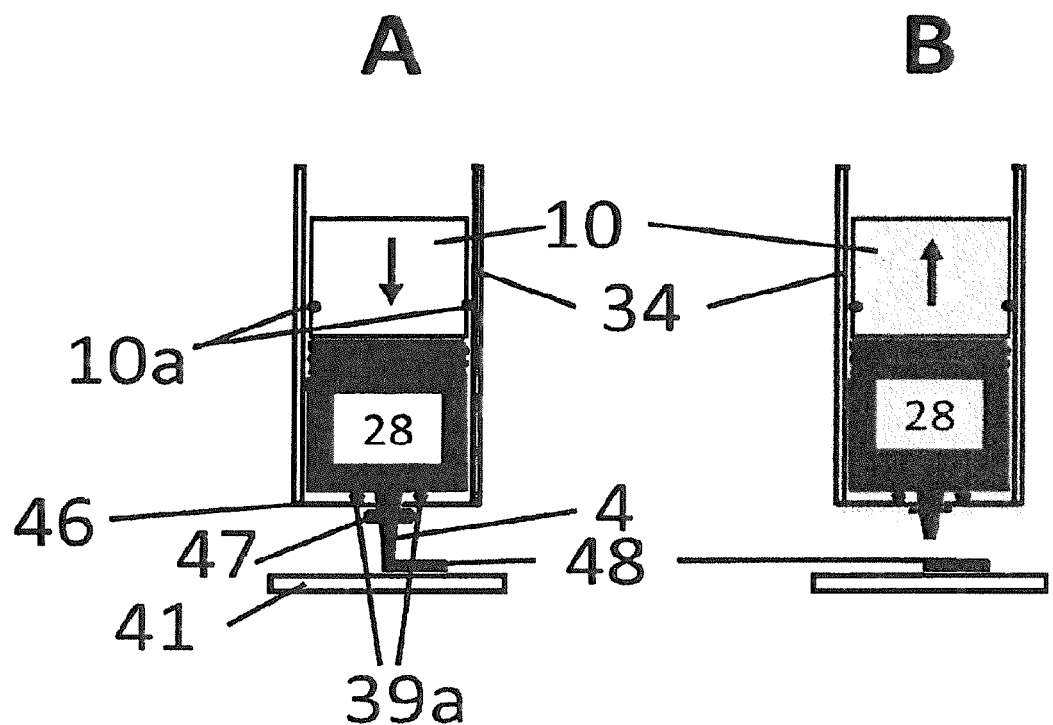

FIG. 10 schematically shows the compression of a metering container according to a preferred embodiment of the present invention;

FIG. 11 shows a metering device according to a preferred embodiment of the present invention;

FIG. 12 schematically shows the use of a metering device according to a preferred embodiment of the present invention in a 3D printer;

FIG. 13 schematically shows the arrangement of various positioning systems, comprising a metering device according to a preferred embodiment of the present invention and a metering container according to a preferred embodiment of the present invention as well as an automated transport system that transports the various metering substrates to the respective metering devices; and FIG. 14 exemplarily shows the process of metering a food product through a metering tip onto a metering substrate in accordance with one or more embodiments.

As illustrated in FIG. 1, the metering container may have various preferred embodiments. In the preferred embodiment A, a powder (2) is contained in the metering container (1). The amount of liquid necessary for the powder can be added to the metering container through the liquid supply openings (3) formed after the installation into the metering device and located on the side of the metering opening (4). The openings (3) can be formed by different techniques. Openings (3), for example, can be punched into the wall of the metering container or a flexible membrane (not shown) can be punctured with a hollow needle. The preferred embodiment B shows that the liquid supply openings (3) may also be located on the side opposite the metering opening (4). This is advantageous in that liquid can be introduced, for example, with a hollow needle into the metering container without getting into contact with the powder (2) and possibly contaminating it.

FIG. 2 schematically illustrates the preferred metering operation for a metering container according to the preferred embodiments shown in FIGS. 1A and B. FIG. 2A shows a metering container (1) comprising a powder (2). The openings (3) permit the supply of a liquid into the metering container. In FIG. 2B, a liquid is introduced into the metering container via the openings (3) (see the arrows 7). In FIG. 2C, the liquid (8) is now already within the metering container together with the powder, without the powder and the liquid being homogeneously intermixed or the powder being dissolved in the liquid. FIG. 2D shows the metering operation of a homogeneous mixture of powder and liquid (9) in the metering container and the metering operation of this mixture through the metering opening (4) by means of a plunger (10) that mechanically compresses the metering container (which is indicted by the arrow). The homogeneous intermixture and/or the dissolution of the powder in the liquid is preferably effected automatedly during or after the introduction of the liquid.

FIG. 3 shows a preferred embodiment for obtaining a homogeneous intermixture of, e.g., a powder and water which permits to achieve a homogeneous product of a powder (2) and a liquid (8) even with powder components that do not fast intermix perfectly with water. In the preferred embodiment according to FIG. 3A, this is to be achieved by means of a static mixer (28) positioned in the metering outlet (4). In other words, the powder and the water are present in this embodiment in a way not necessarily completely intermixed and are only intermixed during the application out of the metering outlet (4) by means of projections or blades (28) causing or enhancing the mixture to swirl.

As illustrated in the preferred embodiment according to FIG. 3B, this can be alternatively achieved by a mechanical deformation of the metering container (1), for example, by moving the plunger (10) and the mechanical forces resulting therefrom. The upward and downward movements of the plunger are schematically indicated by arrows in FIG. 3Ba and 3Bb. The plunger (10) has in this context preferably a non-planar, here for example conical, shape, which enables the deformation of the metering container. The first end of the metering container comprising the metering outlet preferably comprises a structure that is complementary to the deformed second end of the metering container and/or the plunger. In this way, a metering operation as complete as possible can be achieved without food products remaining in the metering container.

FIG. 4 illustrates a preferred device for introducing the liquid (8) into the metering container (1) via an opening (3) that is closed by an elastic membrane (11). In FIG. 4A, the powder (e.g., a powdery food product) (2) is in the metering container (1). The device for metering the liquid into the metering container comprises an injection means (12) with a hollow needle (13). As illustrated in FIG. 4B, the membrane (11) is punctured with the hollow needle (13) for introducing the liquid (8). The liquid inflow (7) into the metering container (1) is achieved via pressure exerted by the injection means (12). The powder (2) and the liquid (8) are homogeneously intermixed here so as to form the homogeneous mixture (9) (cf. FIG. 4C). In FIG. 4C, this preferred embodiment is illustrated during the printing operation of the homogeneous printing mixture (9), i.e., during dispensing the mixture from the metering outlet (4). In the First step, the hollow needle (13) is retracted into the injection means (12) (cf. the arrow (14)) so that the elastic membrane (11) is closed again and reseals the metering container comprising the printing mixture. The powder-liquid mixture (9) is metered out through the metering outlet (4) by means of pressure of the plunger (10) onto the metering container. The elastic membrane (11) is configured such that it does not reopen during the printing operation even at the perforation site generated by the hollow needle (13).

FIG. 5 shows an alternative preferred device for introducing the liquid into the metering container via an opening (3) which in the closed state is closed by a valve (15). In the preferred embodiment in FIG. 5A, the valve (15) closes the metering container (1) containing the powder (2). In FIG. 5B, the liquid (8) is introduced into the metering container (1). Due to the pressure exerted by the injection of the liquid, the valve automatically opens so that the liquid inflow (7) from the injection means (12) into the metering container (1) and subsequently the intermixture of the powder (2) with the liquid into a homogeneous mixture (9) can take place.

In FIG. 5C, this preferred embodiment is shown during the printing operation of the homogeneous printing mixture (9). Pressure is exerted onto the valve (15) from the inside of the metering container by means of the plunger (10) so that the valve (15) gets automatically closed again and seals the metering container (1) containing the printing mixture (9). The powder-liquid mixture (9) is metered out through the metering outlet (4) by the pressure of the plunger (10) onto the metering container.

FIG. 6 illustrates exemplarily the supply of the liquid (16) from a storage container (liquid storage) of the device via a feed pump (17) and a tube or pipe system (18) through an optional filter (19), an injection means (12) and the opening (3) ultimately into the metering container (1).

FIG. 7 schematically shows the structure of a multicomponent metering system (20) comprising three metering units (9). The printing platform (21) is movable in one direction (x-direction), the metering units (9) are movable in two directions (y-direction and z-direction). A heating device (22) is arranged in the x direction beside the metering units.

FIG. 8 exemplarily shows a combined printing and heating operation. In the first step, the printing platform (21) is positioned below the metering units (9). A three-dimensional food product (23) is formed during the metering operation by a combined movement of the printing platform (21) and the metering units (9) in space, said food product being additionally subjected to a heating step by displacing the printing platform (21) towards the heating unit (22) arranged beside the metering units. A food product (24) refined by heating is thus obtained. It is particularly preferred to provide an additional heating unit when cracker-like food products or snacks are to be printed. In this case, water is first mixed with the dry dough components for the cracker, the cracker dough is subsequently printed in the desired shape and subsequently (or partially simultaneously) baked by means of the heating unit.

FIG. 9 illustrates how the flexural strength is determined on the basis of DIN EN ISO 178. The gap width (26) is 35 mm, the plastic strip (27) of the metering container used for the measurement has a size of 60×10 mm. By means of a wedge (25) moving downwards at a rate of 1 mm/s at 20° C. (temperature of the overall measuring system and the environment), being made of aluminum and having a height of 30 mm and a width and length at the upper side of 15 mm each, the maximum force necessary for a deformation of the plastic strip in the course of a penetration depth of 20 mm is determined (flexural strength in mN).

The Figures illustrate the subject-matter of the invention using the example of a powder/powdery food product. However, other food products described in the context of the invention can likewise be contained instead of a powdery food product.

As shown in FIG. 10, the flexible wall (28a) permits the metering container containing the food product (28) to be compressed without great additional effort. Moreover, it ensures that the flexible wall (28a) and thus also the food product (28) contained in the metering container have a contact over as large an area as possible with the inner surface of the cylinder of the metering unit (34) for accommodating the metering container after compression by the plunger (10), as can be seen in FIG. 11.

Preferably, the material to be selected for the metering container is plastics from the group of polyethylenes, polypropylenes and polyacetates, wherein also a combination of the different mentioned plastics may be advantageous. In particular, the absence of plasticizers which may be transferred into food products, the suitability for pasteurization or even sterilization as well as the weldability and the ability to be adhered are advantageous according to the present invention. In the case of known tube-shaped metering containers, such a flexible deformation is not possible. Thus, such metering containers inflexibly bend. Consequently, uniform metering, emptying the metering container to an extent as complete as possible as well as sufficient heat transfer in the case of contact heating of the metering container via a heat source on the inner side of the cylinder of the metering system are not possible in the case of a metering system comprising a plunger.

In order to ensure uniform metering, sufficient emptying and tempering, the metering container according to the present invention should preferably exhibit a flexural strength of 50 mN or less, more preferably of 30 mN or less and most preferably of 10 mN or less in the region or the flexible wall (28a). According to the present invention, the flexural strength is determined on the basis of DIN EN ISO 178 (cf. FIG. 9).

As can be deduced from FIG. 11, the metering container comprises at its lower end a metering outlet (4) which advantageously can be configured as a metering tip. The food product is metered by the metering device through this metering outlet. In order to permit the food product to be precisely metered, the metering outlet preferably comprises an opening cross-sectional area of 8 mm$^2$ or less, preferably of 6 mm$^2$ or less, most preferably of 3 mm$^2$ or less.

Advantageously, this metering outlet (4) is surrounded by a stabilizing portion (39) which is most preferably circular and counteracts the pressure of the plunger onto the metering container and thus the food product. A metering tip can be either permanently fixed to the metering opening or snapped onto the metering opening.

Some food products exhibit too high a viscosity at normal ambient temperature (about 20° C.). Thus, these food products cannot be metered without an increase in temperature. Chocolate or gelled products are mentioned as examples for such food products.

For the purpose of such applications, the heat conductivity of the flexible wall (28a) of the metering container should preferably be higher than 0.1 W/m K, more preferably higher than 0.15 W/m K and most preferably higher than 0.2 W/m K. These heat conductivities permit a fast and sufficient heat transfer from the heating elements to the food products without undesirably long preheating times of longer than 20 min from 20 to 35° C.

When the metering tip has too large a volume and/or is loo long, the food product undesirably cools in the metering lip already during the metering operation or during short metering breaks to such an extent that the viscosity gets disadvantageously high and the metering operation therefore has to be interrupted.

Therefore, the metering tip should preferably be selected so as to be as short as possible in the case of food products which have to be tempered for decreasing their viscosity.

The length of the metering tip measured from the lower side of the stabilizing portion should be 20 mm or less, preferably 10 mm or less and most preferably 5 mm or less.

In order to obtain a completely closed metering container, the metering opening or the metering tip should be completely tightly closed prior to the first use preferably by means of a metering closure (4a). Preferably, the metering container should also be completely tightly resealable by means of the metering closure (4a) for the purpose of storage between the various metering operations.

Just like the flexible wall of the metering container, the stabilizing portion as well as the metering tip may also be made of the plastics polyethylene, polypropylene or polyacetate as well as combinations of these plastics.

They can be tightly connected to each other via welding or adhesion. Preferably, the flexible wall of the metering container, the stabilizing portion as well as the metering tip consist of plastic or a plastic combination. The flexural stiffness of the different components is adjusted in a defined manner by the selection of different material thicknesses.

Preferably, the metering container has a data portion (36) which contains data on the food product contained in the metering container. These may be in particular data on the necessary metering temperature or on the maximum metering speed. The data portion can comprise a mechanical code, a QR code or an RFID chip or a combination thereof for saving the aforementioned food product data. This data ensures the user an automatedly successful result of the metering operation.

A large volume of the metering container entails a prolonged heating time in the case of food products that have to be tempered to decrease their viscosity. Additionally, a very large volume also calls for a large layout and mass of the metering system. Accordingly, the 3D printer and printhead must then also be very largely configured. Moreover, the large mass requires great forces in the acceleration and deceleration phases during the printing operation. Therefore, the volume of the metering container should preferably be 500 ml or less, more preferably 200 ml or less and most preferably 100 ml or less.

According to the present invention, the flexible wall of the metering container along with the stabilizing portion may have the shape of a tube or cylinder.

The metering container according to the present invention is preferably filled with food products in a flowable form. Additionally, food products in solid form are also conceivable, said food products can be converted into a flowable form either by a change in temperature or by liquids introduced into the metering container. These liquids are preferably water or alcohol, milk, crushed fruit or vegetable products or mixtures thereof, which already may also contain other food product ingredients. These other ingredients can be preferably sweetening ingredients such as sugar, artificial sweeteners or other sweetening compounds, as well as salts, proteins, flavoring agents, coloring agents, acids, bitter constituents, oils or dietary fibers as well as combinations of these substances.

What is meant by flowable food products in the context of the present invention are preferably food products having a viscosity of less than $10^7$ mPas, preferably less than $5 \times 10^6$ mPas, most preferably less than $10^6$ mPas.

In particular crushed fruit, vegetable, meat or fish products, solutions of gelling agents, of thickening agents, egg, milk or flour products with water, cacao or coffee products, oils or combinations of these food products form part of the group of flowable food products.

Solid food products which get flowable upon a change in temperature change their flowability with the temperature. This change in temperature may be either an increase or a decrease in temperature which leads to a decrease in viscosity. As examples, chocolate or products containing cacao and/or fats and/or oils, gelled products such as fruit, vegetable or other food product jellies are mentioned.

Additionally, as mentioned, the viscosity of solid food products can also be decreased by the addition of liquids. Exemplarily, reference is made in this context to powder products such as dried potato products, cereal products such as pasta or dough, as well as mixtures of solid carbohydrates such as, for example, maltodextrin and/or starch comprising flavoring and/or taste-producing substances and/or gelling and thickening agents.

The metering container can be installed into a metering device for food products according to the present invention for the purpose of precisely metering the rood products contained in the metering container.

In the context of the present invention, what is meant by a metering device is preferably a device into which the metering container can be placed and which meters the food product out of a metering outlet by means of the pressure of a movable plunger onto the metering container.

As exemplarily shown in FIG. 11, this metering device can consist of a cylinder (34) for accommodating the metering container and of a plunger (10) which is movably supported in the cylinder and adapted to compress a metering container accommodated in the cylinder. This can be realized by means of a motor (10b) which is connected to the plunger (10) and adapted to move the plunger in the cylinder.

The motor is preferably arranged within the cylinder in the plunger. In metering systems known so far, the motor is arranged above or outside the cylinder and is usually connected via a gear or a toothed belt to a feed means which moves the plunger. Alternatively, the motor could also be arranged directly with the feed means above the cylinder. In this case, however, the motor necessarily would have to be additionally fixed since it would move along with the feed means upwards and downwards in the course of the metering operation.

This would lead to a disadvantageous increase in weight and volume of the upper part of the metering means.

The arrangement of motor within the plunger according to the present invention thus permits advantageously the implementation of a more compact design of the metering unit and a more simple structure of the overall metering system.

The feed means (30) according to the present invention is rotated by means of the motor. The feed means engages with a fixedly mounted counterpart (31) such that a rotation of the feed means moves the plunger in the cylinder. The lid (32) in which the fixedly mounted counterpart (31) is secured is fixed by a tight connection to the cylinder (10).

The feed means (30) preferably comprises a first thread while the fixedly mounted counterpart (31) preferably comprises a second thread meshing with the first thread. According to the present invention, the feed means can preferably be a screw or threaded bolt while the fixedly mounted counterpart (31) is preferably a screw nut.

A reduction gear may be arranged between the motor and the feed means, wherein the feed means is preferably positioned in the middle of the plunger in order to ensure a uniform movement of the plunger within the cylinder.

In order to prevent a rotation of the plunger around the feed means while the motor is running, the plunger is locked in the lid (32) via a connection (29).

Exact metering of the food product is particularly well possible if the strand of the food product that escapes from the metering outlet because of the pressure of the plunger onto the metering container due to the rotation of the motor can be quickly interrupted. Due to the usually high viscosity of the food product, this is possible, for example, when the food product is slightly retracted into the metering opening by means of a slight underpressure from the top. This can be achieved according to the present invention, i.a., when the plunger is mounted into the cylinder according to the present invention such that it separates the spaces above and below the cylinder from each other in an airtight manner. An underpressure which slightly retracts the food product through the metering opening can then be generated in the region of the metering container by a reversal of the sense of rotation of the motor and by the upward movement of the plunger caused thereby.

As already explained, the temperature of the food products in the metering container can be modified to some extent in order to decrease the viscosity such that the food products can be metered. According to the present invention, this can be realized by means of a heating element (33) that tempers the metering container and is preferably arranged at the inside of the cylinder (34).

More preferably, the heating element can be configured as a heating strip, heating film or heating wire as well as of combinations of these heating elements. The temperature of the metering container and thus the food product contained therein can be continuously measured by means of a temperature sensor (37) arranged in the cylinder at the metering container.

This is particularly advantageous in the case of food products to be metered that require a defined metering temperature or require a defined temperature control for achieving optimum metering results. Exemplary food products are chocolate or jelly fruits, which can be optimally metered at temperatures just above the gelling or solidifying temperature. Such marches of temperature or the adjustment of defined temperatures can be achieved with a control means for controlling the heating element depending on the measured temperature.

This information, such as exemplarily the required metering temperatures or marches of temperature or also the optimum metering speed, can be stored in a data portion (36) at the metering container. These data can be captured by means of sensors in the metering device (38) and the optimum metering speed can be adjusted by means of a control means via the motor causing the movement of the plunger via the feed means. As already mentioned, this control means can additionally also control the adjustment of specific temperatures or marches of temperature.

FIG. 12 illustrates, in the case that the metering device (42) comprising the metering container is installed into a 3D printer or another positioning device such as exemplarily a robot arm, the way in which the control unit can additionally ensure the communication between the metering device and the 3D printer or the positioning unit with respect to, for example, the metering speed depending on the positioning speed or an interruption of the metering operation depending on the positioning or on the generation of a required temperature signal or metering signal for the 3D printer or the positioning device.

Thus, such a metering device can be advantageously used without a significant modification of the software of the 3D printer or the positioning unit.

In order to achieve optimum metering results when the metering device is installed in a 3D printer or another positioning unit, the metering device itself is preferably moved in all three dimensions by means of the positioning means. Thus, the metering substrate (41) such as exemplarily a plate does not have to be moved during the metering process. In contrast to 3D positioning systems in which the metering substrate usually must be moved during the metering process in one or two directions for the generation of 2D or 3D structures, in the system according to the present invention, in particular fragile food product objects are not subjected to potentially destroying mechanical load resulting from a movement of the metering substrate during the metering process.

FIG. 13 exemplarily illustrates that the structures shaped in the course of a metering process often consist of several individual objects of different food products. In order to be able to achieve an economical metering operation in respect of time, several positioning systems comprising metering devices are combined in spatial proximity according to the present invention. The metering substrate is preferably carried by a transport system from one positioning system to the next according to the food products to be metered. This can be performed according to the present invention either by a conveyor belt or by movable transport platforms (43). Thus, a faster production of even complex structures consisting of several food products on one metering substrate is advantageously possible.

What is meant by a movable transport platform in the context of the present invention is preferably a member onto which a metering substrate can be placed and which can be moved between the 3D printers, for example, by means of a wheel drive, air cushion drive or another drive. The system is preferably an autonomously moving system.

The information with respect to the food product(s) to be printed may be stored according to the present invention on a data portion (44) on the metering substrate or the transport system. This information enables the transport system to calculate the optimum path between the different positioning systems and the individual positioning systems can read out the shape and kind of the object to be printed by means of a sensor (45).

The data portion can be preferably either a mechanical code, a bar code, a QR code, an RFID chip or a combination thereof.

FIG. 14 exemplarily shows the process of metering a food product (28) through the metering tip (4) onto a metering substrate (41) using a particularly preferred embodiment of the metering device according to the present invention. In this embodiment, the plunger (10) is advantageously connected to the cylinder (34) by one or more seals, for example, a ring seal (10a), or other devices such that the spaces above and below the seal are separated from each other in an airtight and/or gaslight manner. Additionally, it is preferred according to the present invention that a seal (39a) ensures an airtight and/or gastight closure between the metering container and the metering device also in the region around the metering tip (4). For example, a seal such as, e.g., a sealing ring (39a) can be provided between the first end of the metering container, at which the metering tip (4) is provided, and an edge portion of the cylinder, as is indicated in FIG. 14. Alternatively or additionally, one or more seals may be provided between the first end of the metering container, at which the metering tip (4) is provided, and the inside of the cylinder.

It is further preferred that a fixing means is provided which is adapted to fix a part of the metering container in and/or at the cylinder. According to the present invention, this can be achieved, for example, by a local broadening or a projection (47) of the metering tip (4). A clamping device at the metering container (46) presses the entire metering container onto the seal (39a) by engagement with the broadening (47) and thus ensures a continued gastight closure between the metering container and the metering device when the movement of the metering plunger is reversed. It is, of course, also possible that another fixing means is provided instead of the outlined clamping connection. For instance, a part of the metering container and in particular its first end could also be detachably fixed or detachably locked to the cylinder by means of a screwed connection or a bayonet joint.

With this preferred device, the metering operation can be very fast interrupted in that the movement of the metering plunger (10) as illustrated in FIG. 14A is reversed (FIG. 14B) and thus the food product to be metered is transported back into the metering tip by means of the underpressure formed thereby in the space between the seals (10a and 39a). The seals (10a) and (39a) prevent air from entering the space between the inside of the cylinder and the outside of the metering container so that the resulting underpressure can only be compensated for by a reflux of the food product. Thus, an undesired flow continuation of the food product out of the metering outlet after the interruption of the metering operation can be prevented.

The invention claimed is:

1. A method for metering a food product, comprising the following steps;
    (a) providing a metering device for the food product, said metering device comprising a cylinder for accommodating a metering container for the food product and a plunger which is movably supported in the cylinder and adapted to compress the metering container accommodated in the cylinder, wherein the metering device comprises a motor connected to the plunger and adapted to move the plunger in the cylinder, and wherein an outside of the plunger of the metering device engages with an inside of the cylinder of the metering device in an airtight manner:
    (b) introducing the metering container for the food product into the cylinder of the metering device, wherein the metering container comprises a flexible wall having a wall thickness of 0.1 mm or less and a first end having a metering outlet and wherein the metering container contains the food product;
    (c) closing the region around the metering outlet by means of the metering device in an airtight manner;
    (d) moving the plunger of the metering device by means of the motor of the metering device such that the metering container is compressed so that the food product escapes from the metering outlet; and
    (e) retracting the plunger of the metering device by means of the motor of the metering device such that aara underpressure is generated in the region of the metering container in order to retract the food product through the metering outlet.

2. The method according to claim 1, wherein a seal is provided between the outside of the plunger and the inside of the cylinder.

3. The method according to claim 1, wherein the first end of the metering container engages with the inside of the cylinder and/or an edge portion of the cylinder in an airtight manner.

4. The method according to claim 3, wherein a seal is provided between the first end of the metering container and the inside of the cylinder and/or an edge portion of the cylinder.

5. The method according to claim 1, further comprising removably attaching the first end of the metering container and/or the metering outlet to the inside of the cylinder and/or to an edge portion off the cylinder.

6. The method according to claim 1, further comprising, repositioning the metering outlet in space and repeating steps (d) and (e).

7. The method according to claim 6, further comprising forming a 3D structure of the metered food product.

8. The method according to claim 7, further comprising heating the metered food product.

9. The method according to claim 1, further comprising a further step between steps (b) and (d):
    introducing liquid into the metering container:
    wherein step (d) comprises: moving the plunger of the metering device by means of the motor of the metering device such that the metering container is compressed so that a mixture of the food product and the liquid escapes from the metering outlet.

10. The method according to claim 9, wherein the meeter in container comprises elastic membrane which tightly seals the metering container, wherein the metering device comprises a hollow needle for introducing the liquid and wherein the step of introducing a liquid into the metering container comprises;
    puncturing the membrane with the hollow needle; and
    introducing the liquid through the hollow needle.

11. The method according to claim 9, wherein the metering container comprises an opening which is tightly sealed with a valve, preferably a check valve, and wherein the valve is opened by introducing the liquid.

12. The method according to claim 9, wherein the metering container comprimises a means which aids in the intermixture of the food product and the liquid.

13. The method according to claim 12, wherein the means is provided at and/or in the metering outlet.

14. The method accordingto claim 9, wherein the food product is a powder.

15. The method according to claim 14, wherein the powder comprises particles having a minimum particle size of 15 μm.

16. The method according to claim 14, wherein the powder has a density below 1.5 g/cm3.

17. The method according to claim 14, wherein the powder has a density below 1 g/cm3.

18. The method according to claim 1, wherein the metering outlet comprises an opening cross-sectional area of 8 mm$^2$ or less.

19. The method according to claim 1, wherein the metering outlet comprises an opening cross-sectional area of 6 mm$^2$ or less.

20. The method according to claim 1, wherein the metering outlet comprises an openening cross-sectional area of 3 mm$^2$ less.

* * * * *